(12) United States Patent
Chen et al.

(10) Patent No.: US 10,168,414 B2
(45) Date of Patent: Jan. 1, 2019

(54) WIRELESS SIGNALS AND TECHNIQUES FOR DETERMINING LOCATIONS OF OBJECTS IN MULTI-PATH ENVIRONMENTS

(71) Applicant: Origin Wireless, Inc., Greenbelt, MD (US)

(72) Inventors: Yan Chen, ChengDu (CN); Zhung-Han Wu, Silver Spring, MD (US); Yi Han, Greenbelt, MD (US); K. J. Ray Liu, Potomac, MD (US)

(73) Assignee: Origin Wireless, Inc., Greenbelt, MD (US)

( * ) Notice: Subject to any disclaimer, the term of this patent is extended or adjusted under 35 U.S.C. 154(b) by 0 days.

(21) Appl. No.: 14/605,611

(22) Filed: Jan. 26, 2015

(65) Prior Publication Data

US 2016/0018508 A1    Jan. 21, 2016

Related U.S. Application Data

(60) Provisional application No. 62/069,090, filed on Oct. 27, 2014, provisional application No. 62/025,795, filed on Jul. 17, 2014.

(51) Int. Cl.
  *G01S 5/02* (2010.01)
(52) U.S. Cl.
  CPC ................... *G01S 5/0252* (2013.01)
(58) Field of Classification Search
  CPC .................... H04W 64/00; G01S 5/0252
  USPC ......... 455/456.1, 456.2, 456.3, 456.4, 456.5, 455/456.6, 457, 504, 505, 506
  See application file for complete search history.

(56) References Cited

U.S. PATENT DOCUMENTS

| | | |
|---|---|---|
| 2,933,702 A | 4/1960 | Bogert |
| 3,767,855 A | 10/1973 | Ueno et al. |
| 5,092,336 A | 3/1992 | Fink |
| 5,155,742 A | 10/1992 | Ariyavisitakul et al. |
| 5,428,999 A | 7/1995 | Fink |
| 5,926,768 A | 7/1999 | Lewiner et al. |
| 6,301,291 B1 | 10/2001 | Rouphael et al. |
| 6,490,469 B2 | 12/2002 | Candy |

(Continued)

FOREIGN PATENT DOCUMENTS

| | | |
|---|---|---|
| EP | 2 571 214 | 11/2012 |
| WO | WO 2007/031088 | 3/2007 |

(Continued)

OTHER PUBLICATIONS

U.S. Appl. No. 13/706,342, filed Dec. 5, 2012, Yang et al.

(Continued)

*Primary Examiner* — Kamran Afshar
*Assistant Examiner* — Nicole M Louis-Fils
(74) *Attorney, Agent, or Firm* — Fish & Richardson P.C.

(57) ABSTRACT

A time-reversal positioning system includes a storage storing first data representing channel impulse responses derived from probe signals sent from a plurality of positions and second data representing coordinates of the positions. A data processor determines a position of a terminal device based on the stored channel impulse responses and a time-reversed signal determined based on a time-reversed version of a channel impulse response that is estimated based on a channel probing signal sent from the terminal device.

20 Claims, 19 Drawing Sheets

(56) References Cited

U.S. PATENT DOCUMENTS

| | | | |
|---|---|---|---|
| 6,862,326 | B1 | 3/2005 | Eran et al. |
| 7,362,815 | B2 | 4/2008 | Lindskog et al. |
| 7,440,766 | B1 | 10/2008 | Tuovinen et al. |
| 7,460,605 | B2 | 12/2008 | Candy et al. |
| 7,463,690 | B2 | 12/2008 | Candy et al. |
| 7,587,291 | B1 | 9/2009 | Sarvazyan et al. |
| 7,768,876 | B2 | 8/2010 | Dahl et al. |
| 8,195,112 | B1 | 6/2012 | Zhang et al. |
| 8,346,197 | B2 | 1/2013 | Huy et al. |
| 8,411,765 | B2 | 4/2013 | Smith et al. |
| 8,451,181 | B2 | 5/2013 | Huy et al. |
| 8,457,217 | B2 | 6/2013 | Huy et al. |
| 8,498,658 | B2 | 7/2013 | Smith et al. |
| 8,593,998 | B2 | 11/2013 | Huy et al. |
| 8,743,976 | B2 | 6/2014 | Smith et al. |
| 8,792,396 | B2 | 7/2014 | Huy et al. |
| 8,831,164 | B2 | 9/2014 | Lu |
| 2003/0138053 | A1 | 7/2003 | Candy et al. |
| 2004/0156443 | A1 | 8/2004 | Dent |
| 2005/0046584 | A1* | 3/2005 | Breed .............. B60C 11/24 340/13.31 |
| 2006/0098746 | A1 | 5/2006 | Candy et al. |
| 2006/0115031 | A1 | 6/2006 | Lindskog et al. |
| 2007/0010956 | A1 | 1/2007 | Nerguizian et al. |
| 2008/0039114 | A1 | 2/2008 | Phatak et al. |
| 2010/0302977 | A1 | 12/2010 | Huy et al. |
| 2010/0309829 | A1 | 12/2010 | Huy et al. |
| 2011/0164708 | A1* | 7/2011 | Wang .............. H04L 27/2663 375/343 |
| 2012/0056777 | A1* | 3/2012 | Shiba .............. G01S 7/292 342/147 |
| 2012/0155515 | A1 | 6/2012 | Smith et al. |
| 2012/0183037 | A1 | 7/2012 | Allpress et al. |
| 2012/0207234 | A1 | 8/2012 | de Rosny et al. |
| 2012/0257660 | A1 | 10/2012 | Smith et al. |
| 2012/0263056 | A1 | 10/2012 | Smith et al. |
| 2012/0328037 | A1* | 12/2012 | Hsu .............. G01S 1/725 375/267 |
| 2013/0201958 | A1 | 8/2013 | Huy et al. |
| 2013/0223503 | A1* | 8/2013 | Smith .............. H04B 7/24 375/227 |
| 2014/0022128 | A1* | 1/2014 | Smith .............. G01S 5/0273 342/465 |
| 2014/0105054 | A1* | 4/2014 | Sægrov .............. H01Q 3/2605 370/252 |
| 2014/0126567 | A1 | 5/2014 | Husain et al. |
| 2014/0185596 | A1 | 7/2014 | Han et al. |
| 2015/0049745 | A1 | 2/2015 | Han et al. |
| 2015/0049792 | A1 | 2/2015 | Han et al. |
| 2015/0247915 | A1* | 9/2015 | Huang .............. G01S 5/0273 455/456.1 |
| 2015/0257167 | A1* | 9/2015 | Chen .............. H04W 72/085 370/330 |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |

OTHER PUBLICATIONS

U.S. Appl. No. 14/183,648, filed Feb. 19, 2014, Ma et al.
U.S. Appl. No. 14/202,651, filed Mar. 10, 2014, Chen et al.
U.S. Appl. No. 14/262,153, filed Apr. 25, 2014, Yang et al.
Abbasi-Moghadam, D. and V.T. Vakili, "A SIMO one-bit time reversal for UWB communication systems", EURASIP J. Wireless Comm. and Networking, 2012:113, 2012.
Albert, D., L. Liu, M. L. Moran, "Time Reversal processing for source location in an urban environment (L)", J. Acoust. Soc. Am., vol. 118, No. 2, pp. 616-619, Aug. 2005.
Bahl, P. and Padmanabhan, V., "Radar: An In-Building RF-based User Location and Tracking System", *IEEE INFOCOM*, pp. 775-784 (2000).
Brysev, A.P., L.M. Krutyanskii, V'L. Preobrazhenskii, "Wave Phase Conjugation in ultrasonic beams", Physics-Uspekhi, vol. 41, No. 8, pp. 793-805, 1998.
Chang, Y.H., S.H. Tsai, X. Yu, C.C. J. Kuo, "Ultrawideband Transceiver Design Using Channel Phase Precoding", IEEE Trans. Sig. Proc., vol. 55, No. 7, pp. 3807-3822, Jul. 2007.
Chen, Y. et al., "Time-reversal wideband communications," IEEE Signal Processing Letters, vol. 20(12):1219-1222 (Dec. 2013).
Chen, Y., F. Han, Y.H. Yang, H. Ma, Y. Han, C. Jiang, H.Q. Lai, D. Claffey, Z. Safar, K.J.R. Liu, "Time-Reversal Wireless Paradigm for Green Internet of Things: An Overview", IEEE Internet of Things Journal, vol. 1, No. 1, Feb. 2014.
Daniels, R.C. and R. W. Heath, "Improving on time-reversal with MISO precoding," in the Proceedings IWC/WPMC, Aalborg, Denmark, Sep. 2005.
Daniels, R.C. and R. W. Heath, "MISO precoding for temporal and spatial focusing" in the Proceedings of the Eighth International Symposium on Wireless Personal Communications Conference, Aalborg, Denmark, 2005.
De Rosny, J., G. Lerosey and M. Fink, "Theory of Electromagnetic Time-Reversal Mirrors", IEEE Trans. Antennas Propag., vol. 58, No. 10, pp. 3139-3149, Oct. 2010.
Derode, A., A. Tourin, and M. Fink, "Ultrasonic pulse compression with one-bit time reversal through multiple scattering", J. Appl. Phys., vol. 85, No. 9, pp. 6343-6352, May 1999.
Derode, A., A. Tourin, J. de Rosny, M. Tanter, S. Yon, and M. Fink, "Taking Advantage of Multiple Scattering to Communicate with Time-Reversal Antennas", Phys. Rev. Lett., vol. 90, No. 1, 014301, Jan. 2003.
Derode, A., P. Roux, and M. Fink, "Robust Acoustic Time Reversal and High-Order Multiple Scattering", Phys. Rev. Lett., vol. 75, No. 23, pp. 4206-4210, Dec. 1995.
Dorme, C. and M. Fink, "Focusing in transmit-receive mode through inhomogeneous media: The time reversal matched filter approach", J. Acoust. Soc. Am., vol. 98, Pt. 1, pp. 1155-1162, Aug. 1995.
Edelmann, G.F., T. Akal, W.S. Hodgkiss, S. Kim, W.A. Kuperman and H.C. Song, "An Initial Demonstration of Underwater Acoustic Communication Using Time Reversal", IEEE J. Ocean Eng., vol. 27, No. 3, Jul. 2002.
Emami et al., "Matched Filtering with Rate Back-off for Low Complexity Communications in Very Large Delay Spread Channels," 38th Asilomar Conference on Signals, Systems and Computers, pp. 218-222, 2004.
Emami, S.M., J. Hansen, A.D. Kim, G. Papanicolaou, A.J. Paulraj, D. Cheung, C. Prettie, "Predicted Time Reversal Performance in Wireless Communications using Channel Measurements", publication details unknown.
Fink, M. and C. Prada, "Acoustic Time-Reversal Mirrors", Inverse Problems, vol. 17, pp. R1-R38, 2001.
Fink, M., "Time Reversal of Ultrasonic Fields—Part I: Basic Principals", IEEE Trans. Ultrasonics, Ferroelectrics and Freq. Contr., vol. 39, No. 5, pp. 555-566, Sep. 1992.
Fink, M., "Time-Reversal Mirrors", J. Phys. D: Appl. Phys., vol. 26, pp. 1333-1350, 1993.
Fink, M., "Time-Reversed Acoustics", Scientific American, pp. 91-97, Nov. 1999.
Fink, M., C. Prada, F. Wu, and D. Cassereau, "Self focusing in inhomogeneous media with time reversal acoustic mirrors," IEEE Ultrasonics Symposium, vol. 1, pp. 681-686, 1989.
Fontana, R.J., S.J. Gunderson, "Ultra-Wideband Precision Asset Location System", Proc. of the IEEE Conf. on UWB Sys. and Tech., pp. 147-150, 2002.
Guo, N., B.M. Sadler and R.C. Qiu, "Reduced-Complexity UWB Time-Reversal Techniques and Experimental Results", IEEE Trans. on Wireless Comm., vol. 6, No. 12, Dec. 2007.
Gwon, Youngjune and Jain, Ravi, "Error Characteristics and Calibration-free Techniques for Wireless LAN-based Location Estimation", *MobiWac '04*, 8 pages (2004).

(56) References Cited

OTHER PUBLICATIONS

Han, F. and K.J.R. Liu, "A multiuser TRDMA uplink system with 2D parallel interference cancellation," IEEE Transactions on Communications, vol. 62(3):1011-1022 (Mar. 2014).
Han, F. and K.J.R. Liu, "An Interference Cancellation Scheme for the Multiuser TRDMA Uplink System," Global Telecommunications Conference, pp. 3583-3588 (2013).
Han, F., "Energy Efficient Optimization in Green Wireless Networks", University of Maryland Ph. D. Dissertation, 2013.
Han, F., Y.H. Yang, B. Wang, Y. Wu, K.J.R. Liu, "Time-reversal division multiple access in multi-path channels," Global Telecommunications Conference, pp. 1-5 (2011).
Han, F., Y.H. Yang, B. Wang, Y. Wu, K.J.R. Liu, "Time-reversal division multiple access over multi-path channels," IEEE Transactions on Communications, vol. 60(7):1953-1965 (Jul. 2012).
Henty, B.E. and D.D. Stancil, "Multipath-Enabled Super-Resolution for rf and Microwave Communication using Phase-Conjugate Arrays", Phys. Rev. Lett., vol. 93, 243904, Dec. 2004.
Jin, Jy. and .M.F. Moura, "Time Reversal Detection Using Antenna Arrays", IEEE Trans. on Signal Process., vol. 57, No. 4, Apr. 2009.
Khalegi, A., G. El Zein and I. Navqi, "Demonstration of Time-Reversal in Indoor Ultra-Wideband Communication: Time Domain Measurement", IEEE Proc. of ISWCS, pp. 465-468, 2007.
Kuperman, W.A., W.S. Hodgkiss, H.C. Song, T. Akal, C. Ferla, D.R. Jackson, "Phase conjugation in the ocean: Experimental demonstration pf an acoustic time-reversal mirror", J. Acoust. Soc. Am., vol. 103, No. 1, pp. 25-40, Jan. 1998.
Kyritsi, P. and G. Papanicolau, "One-bit Time Reversal for WLAN Applications", IEEE 16$^{th}$ Intern. Symp. on Personal, Indoor and Mobile Radio Comm., pp. 532-536, 2005.
Kyritsi, P. et al., "Time reversal and zero-forcing equalization for fixed wireless access channels," 39th Asilomar Conference on Signals, Systems and Computers, pp. 1297-1301 (2005).
Kyritsi, P. et al., "Time reversal techniques for wireless communications," IEEE Vehicular Technology Conference, vol. 1:47-51 (2004).
Lemoult, F., G. Lerosey, J. de Rosny, and M. Fink, "Manipulating Spatiotemporal Degrees of Freedom in Waves of Random Media", Phys. Rev. Lett., vol. 103, 173902, Oct. 2009.
Lemoult, F., G. Lerosey, J. de Rosny, and M. Fink, "Resonant Metalenses for Breaking the Diffraction Barrier", Phys. Rev. Lett., vol. 104, 203901, May 2010.
Lerosey, G. et al., "Focusing Beyond the Deffraction Limit with Far-Field Time Reversal", Science, vol. 315:1120-1122 (Feb. 2007).
Lerosey, G., J. de Rosny, A. Tourin, A. Derode, G. Montaldo and M. Fink, "Time Reversal of Electromagnetic Waves", Phys. Rev. Lett., vol. 92, No. 19, 193904, May 2004.
Lerosey, G., J. de Rosny, A. Tourin, A. Derode, G. Montaldo and M. Fink, "Time Reversal of Electromagnetic Waves and Telecommunication", Radio Science, vol. 40, RS6S12, 2005.
Lerosey, G., J. de Rosny, A. Tourin, A. Derode, M. Fink, "Time Reversal of Wideband Microwaves", Appl. Phys. Lett., vol. 88, 154101, Apr. 2006.
Lerosey, G., J. de Rosny, A. Tourin, and M. Fink, "Focusing beyond the diffraction limit with far-field time reversal", Science, vol. 315, pp. 1120-1122, Feb. 2007.
Lienard, M. et al., "Focusing gain model of time-reversed signals in dense multipath channels," IEEE Antennas and Wireless Propagation Letters, vol. 11:1064-1067 ( 2012).
Lim, Hyuk et al., "Zero-Configureation, Robust Indoor Localization: Theory and Experimentation", IEEE, 12 pages (2006).
Ma, H., F. Han, and K.J.R. Liu, "Interference-Mitigating Broadband Secondary User Downlink System: A Time-Reversal Solution", Global Telecommunications Conference, pp. 884-889, (2013).
Montaldo, G., G. Lerosey, A. Derode, A. Tourin, J. de Rosny, and M. Fink, "Telecommunication in a disordered environment with iterative time reversal," Waves Random Media, vol. 14, pp. 287-302, May 2004.
Moura, J.M.F. and Y. Jin, "Detection by Time Reversal: Single Antenna", IEEE Trans. on Signal Process., vol. 55, No. 1, Jan. 2007.

Moura, J.M.F. and Y. Jin, "Time Reversal Imaging by Adaptive Interference Canceling", IEEE Trans. on Signal Process., vol. 56, No. 1, Jan. 2008.
Naqvi, I.H., A. Khaleghi and G. El Zein, "Performance Enhancement of Multiuser Time Reversal UWB Communication System", Proc. of IEEE ISWCS, pp. 567-571, 2007.
Naqvi, I.H., G. El Zein, G. Lerosey, J. de Rosny, P. Besnier, A. Tourin, M. Fink, "Experimental validation of time reversal ultra wide-band communication system for high data rates", IET Microw. Antennas Propag., vol. 4, Iss. 5, pp. 643-650, 2010.
Naqvi, I.H., P. Besnier and G. El Zein, "Effects of Time Variant Channel on a Time Reversal UWB System", Global Telecommunications Conference, (2009).
Nguyen, H. T. et al., "A time reversal transmission approach for multiuser UWB communications," IEEE Transactions on Antennas and Propagation, vol. 54: 3216-3224 (Nov. 2006).
Nguyen, H. T., "On the performance of one bit time reversal for multi-user wireless communications", IEEE Proc. of ISWCS, pp. 672-676, 2007.
Nguyen, H., F. Zheng, and T. Kaiser, "Antenna Selection for Time Reversal MIMO UWB Systems", IEEE Vehicle Technology Conference, pp. 1-5, 2009.
Nguyen, H., Z. Zhao, F. Zheng and T. Kaiser, "On the MSI Mitigation for MIMO UWB Time Reversal Systems", Proc. of IEEE International Conference on Ultra-Wideband, pp. 295-299, 2009.
Nguyen, H., Z. Zhao, F. Zheng, and T. Kaiser, "Preequalizer Design for Spatial Multiplexing SIMO-UWB TR Systems", IEEE Trans. on Vehicular Tech., vol. 59, No. 8, Oct. 2010.
Nguyen, H.T., "Partial one bit time reversal for UWB impulse radio multi-user communications", IEEE Proc. of ICCE, 2008.
Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.
Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.
Niculescu, D. and Nath, B., "VOR Base Stations for Indoor 802.11 Positioning", Proc. of ACM MobiCom (2004).
Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.
Parvulescu, A. and Clay, C. S., "Reproducibility of Signal Transmissions in the Ocean", The Radio and Electronic Engineer, pp. 223-228, Apr. 1965.
Phan-Huy, D. T., S.B. Halima, M. Helard, "Frequency Division Duplex Time Reversal", Global Telecommunications Conference, (2011).
Porcino, D., "Ultra-Wideband Radio Technology: Potential and Challenges Ahead", IEEE Communications Mag., pp. 66-74, Jul. 2003.
Prada, C., F. Wu, and M. Fink, "The iterative time reversal mirror: A solution to self-focusing in the pulse echo mode," J. Acoustic Society of America, vol. 90, pp. 1119-1129, 1991.
Price, R., "A Communication Technique for Multipath Channels", Proceeding of the IRE, vol. 46:555-570 (1958).
Qiu, R. C. et al., "Time reversal with miso for ultra-wideband communications: Experimental results," IEEE Antenna and Wireless Propagation Letters, vol. 5:269-273 (2006).
Rode, J. P., M.J. Hsu, D. Smith and A. Hussain, "Collaborative Beamfocusing Radio (COBRA)", Proc. of SPIE, vol. 8753, pp. 87530J-1-87530J-11, 2013.
Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.
Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.
Sen, Souvik et al., "Spot Localization using PHY Layer Information", Prof. of ACM MobiSys, 14 pages (2012).

(56) References Cited

OTHER PUBLICATIONS

Song, H. C., W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.

Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.

Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).

Wang, B. et al., "Green wireless communications: A time-reversal paradigm," IEEE Journal of Selected Areas in Communications, vol. 29:1698-1710 (2011).

Wu, F., J.L. Thomas, and M. Fink, "Time Reversal of Ultrasonic Fields—Part II: Experimental Results", IEEE Trans. Ultrasonics, Ferroelectrics and Freq. Contr., vol. 39, No. 5, pp. 567-578, Sep. 1992.

Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.

Yang, Y. H., "Waveform Design and Network Selection in Wideband Small Cell Networks", University of Maryland Ph. D. Thesis, 2013.

Yang, Y. H., B. Wang and K.J.R. Liu, "Waveform Design for Sum Rate Optimization in Time-Reversal Multiuser Downlink Systems", Global Telecommunications Conference, (2011).

Yang, Yu-Han et al., "Near-optimal waveform design for sum rate optimization in time-reversal multiuser downlink systems," vol. 12(1):346-357 (Jan. 2013).

Youssef, M. and Agrawala, A., "The Hours WLAN Location Determination System", *Proc. of ACM MobiSys* (2005).

Yuanwei, Jin et al., "Adaptive time reversal beamforming in dense multipath communication networks," 2008 42nd Asilomar Conference on Signals, Systems and Computers, pp. 2027-2031 (Oct. 2008).

Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.

International Search Report and Written Opinion issued in International Application No. PCT/US2015/041037 dated Jan. 11, 2016, 14 pages.

Han, F., Yang, Y.-H., Wang, B., Wu, Y., Liu, K.J.R., "Time-reversal division multiple access in multi-path channels", IEEE Globecom, Houston, Dec. 2011.

Han, F., Yang, Y.-H., Wang, B., Y. Wu, K.J.R. Liu, "Time-reversal division multiple access over multi-path channels", IEEE Trans. on Communications, vol. 60:1953-1965, Jul. 2012.

Han, Y., Chen, Y., and Liu, K.J.R, 'Time-Reversal with Limited Signature Precision: Tradeoff Between Complexity and Performance', Proc. IEEE Global Conference on Signal and Information Processing (GlobalSIP), Atlanta, Dec. 2014.

Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.

Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.

Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.

* cited by examiner

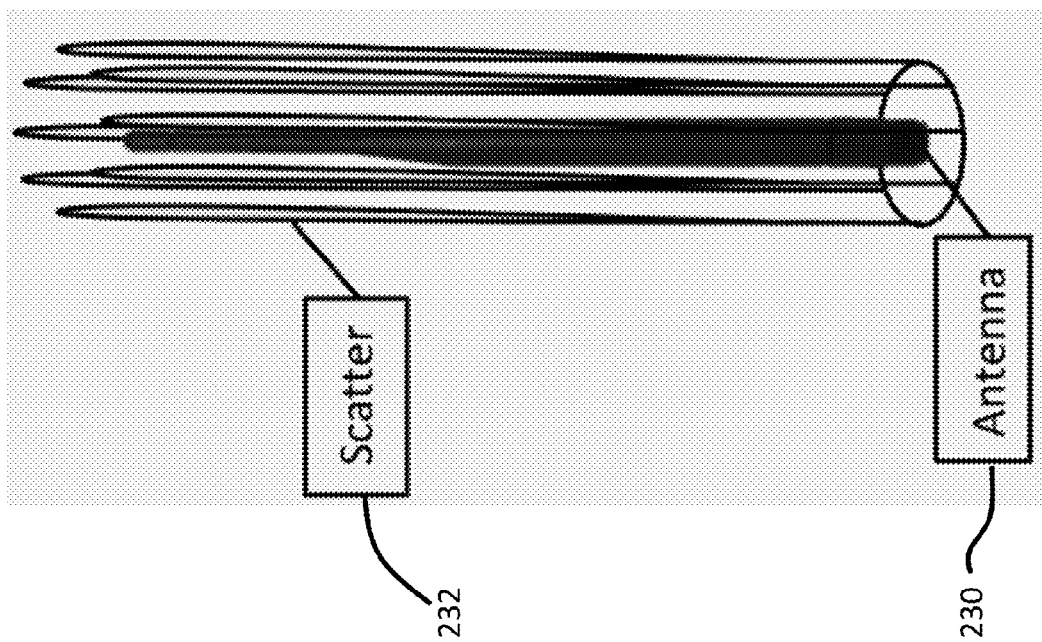

WIRELESS SIGNALS AND TECHNIQUES FOR DETERMINING LOCATIONS OF OBJECTS IN MULTI-PATH ENVIRONMENTS

CROSS-REFERENCE TO RELATED APPLICATIONS

This application claims priority to U.S. Patent Application 62/025,795, filed on Jul. 17, 2014 and to U.S. Patent Application 62/069,090, filed on Oct. 27, 2014. The entire disclosures of the above applications are incorporated herein by reference.

TECHNICAL FIELD

This disclosure relates to positioning systems and to time-reversal positioning systems.

BACKGROUND

The global positioning system (GPS) uses signals from satellites to provide users and devices equipped with GPS equipment location and time information. When a user is navigating inside buildings, GPS signals may be weak or unavailable. In some examples, Wi-Fi signals from wireless access points can be used to determine positions. For example, a wireless device can measure the average received signal strength (RSS) and use the RSS indicator (RSSI) of the received wireless signal to estimate its distance from a wireless access point. Such systems may be able to estimate that a device is a certain distance from an access point, but may not be able to indicate the relative orientation of the device, that is, whether the device is in front or in back or on the side of the access point. In some situations, signals from multiple wireless access points can be used to estimate the position of the device using triangulation, but such schemes have not reported indoor positioning accuracies greater than a few meters. Other known techniques for determining position of a device in an indoor environment include so-called time of arrival (TOA) or time of flight (TAF) techniques, time difference of arrival (TDOA), and angle of arrival (AOA) techniques. These techniques also achieve positioning accuracies of a few meters. Therefore, there is a need for positioning technologies that can determine the position of a user or a device with higher resolution accuracy.

SUMMARY

In exemplary positioning systems, users or devices may send at least one location-specific waveform to a locator, which may also be a wireless module of any type, such as a router, an access point, a base station, a computer, a repeater, a handheld device, and the like. The locator may compare the received location-specific waveform to a predicted waveform, a computer generated waveform, a stored waveform, a previously generated waveform, and the like, that can be or has been associated with a particular location or set of position coordinates. The received location-specific waveforms may be compared in a variety of ways including, but not limited to, convolving one waveform with another, convolving one waveform with a time-reversed version of another, correlating the waveforms, normalizing and subtracting one waveform from the other, and the like, to determine how similar the waveforms are. If the waveforms are determined to be similar enough, then the device sending the received location-specific waveform will be deemed to be at the particular location associated with the predicted, computer generated, stored, and/or previously generated waveform used in the comparison calculation. We describe exemplary embodiments of wireless positioning systems using location-specific waveforms that have been shown to achieve location better than 5 cm using the inventive apparati and methods disclosed here.

In general, in one aspect, a method of determining the position of a device is provided. The method includes at a first device, receiving a probe signal sent from a second device through a multipath channel, the probe signal received at the first device having a waveform that is different from the waveform sent by the second device due to influence of the multipath channel; estimating a channel impulse response based on the probe signal received at the first device; determining a time-reversed signal based on the estimated channel impulse response; and determining a position of the second device based on the time-reversed signal and stored channel impulse responses that are stored in a storage device.

Implementations of the method may include one or more of the following features. The stored channel impulse responses can be derived from probe signals sent from a plurality of positions, each stored channel impulse response derived from a corresponding probe signal sent from a corresponding position, each stored channel impulse response being associated with the position from which the corresponding probe signal was sent. The method can include for each of a plurality of positions, determining a feature value based on a function of the time-reversed signal and the stored channel impulse response associated with the position, and determining the position of the second device based on the position associated with a largest feature value among the feature values. The feature value associated with a position can also be a function of the stored channel impulse response or responses associated with one or more neighboring positions. The feature value associated with a position can be a function of the stored channel impulse responses derived from probe signals sent from the position at a plurality of time periods. Determining the feature value associated with a position can include calculating a convolution of the time-reversed signal and the stored channel impulse response associated with the position. The probe signal can be modulated by a carrier wave, and the position of the second device can be determined with an accuracy within one wavelength, one-half of a wavelength, or one-tenth of a wavelength of the carrier wave. The probe signal can include one or more pulse signals. The probe signal can include one or more pseudorandom codes. The probe signal can include one or more Golay sequences. Information about the position of the second device can be transmitted to the second device, e.g., using time-reversal wireless communication. The method can include receiving coarse positioning data from the second device, selecting a subset of stored channel impulse responses based on the coarse positioning data, and determining the position of the second device based on the time-reversed signal and the subset of stored channel impulse responses.

In embodiments, feature values may be used to determine the position of a device. For example, if the feature value represents the result of a mathematical function performed on a time-reversed version of a measured channel impulse response and each of a number of reference channel impulse responses, then there may be a set of feature values that are generated that describe how closely matched each of the reference channel impulse responses is to the (time-reversed version of the) measured channel response. In those embodiments, the reference channel impulse response that yielded the highest feature value may be deemed to be associated with the same positional coordinates as the measured device. In some embodiments, the feature values may be normalized and the reference channel impulse response that yielded a feature value closest to 1 may be deemed to be the one associated with the same coordinates as the measured device. In embodiments, if none of the calculated feature values exceed a certain threshold, then the system may report that the location of the device cannot be determined or cannot be determined with high certainty. In embodiments, a normalized feature value greater than 0.5, 0.75, 0.8, 0.9, 0.95, or 0.98 may be required to determine that a reference channel impulse response is an accurate enough match to a measured channel impulse response. In embodiments, a normalized feature value less than 1, 0.95, 0.9, 0.8, 0.75, 0.5, 0.25 or 0.1 may be required to determine that none of the reference channel impulse responses is a close enough match to the measured channel impulse response.

In embodiments, feature values may be used to determine the position of a device. For example, if the feature value represents the result of a mathematical function performed on a measured channel impulse response and a time-reversed version of each of a number of reference channel impulse responses, then there may be a set of feature values that are generated that describe how closely matched each of the reference channel impulse responses is to the (time-reversed version of the) measured channel response. In those embodiments, the reference channel impulse response that yielded the highest feature value may be deemed to be associated with the same positional coordinates as the measured device. In some embodiments, the feature values may be normalized and the reference channel impulse response that yielded a feature value closest to 1 may be deemed to be the one associated with the same coordinates as the measured device. In embodiments, if none of the calculated feature values exceed a certain threshold, then the system may report that the location of the device cannot be determined or cannot be determined with high certainty. In embodiments, a normalized feature value greater than 0.5, 0.75, 0.8, 0.9, 0.95, or 0.98 may be required to determine that a reference channel impulse response is an accurate enough match to a measured channel impulse response. In embodiments, a normalized feature value less than 1, 0.95, 0.9, 0.8, 0.75, 0.5, 0.25 or 0.1 may be required to determine that none of the reference channel impulse responses is a close enough match to the measured channel impulse response.

In general, in another aspect, an apparatus to facilitate determining the position of a device is provided. The apparatus includes a storage storing first data representing channel impulse responses derived from probe signals sent from a plurality of positions and second data representing coordinates of the positions.

Implementations of the apparatus may include one or more of the following features. The apparatus can include a data processor configured to determine a position of a terminal device based on a time-reversed signal determined based on a time-reversed version of a channel impulse response that is estimated based on a channel probing signal sent from the terminal device and the stored channel impulse responses.

In general, in another aspect, an apparatus for determining position information is provided. The apparatus includes a transmit module configured to send a channel probing signal to a base station through a multipath channel; and a receive module to receive position data from the base station, the position data having information about coordinates of a position of the apparatus, in which the base station determines the position of the apparatus based on a time-reversed signal derived from a time-reversed version of a channel impulse response that is derived from the received channel probing signal and stored channel impulse responses.

Implementations of the apparatus may include one or more of the following features. The apparatus can include a mobile phone, a camera, a laptop computer, a tablet computer, a wearable computing device, a pair of eyeglasses, a helmet, a goggle, a car, a personal transportation device, a robot, a robotic arm, an unmanned aerial vehicle, a radio, an audio player, a health monitor, a headphone, an object tracker, a name tag, a clothing tag, a merchandise tag, a packaging box, a pen, a stylus, a watch, a bracelet, a necklace, or a cart.

In general, in another aspect, a method of determining the position of a device is provided. The method includes from each of multiple positions within a venue, transmitting a probe signal to a base station through a multipath channel; at the base station, for each of the received probe signals, estimating a channel impulse response and associating the channel impulse response with the position from which the corresponding probe signal was sent; storing, in a storage, first data representing the estimated channel impulse responses and second data representing the positions associated with the channel impulse responses.

Implementations of the method may include one or more of the following features. The multiple positions can be spaced apart equal to or less than a wavelength, one-half of the wavelength, or one-tenth of the wavelength of a carrier wave of the probe signal. Scattering elements can be used to scatter the probe signal towards multiple propagation paths when being transmitted to the base station. At each of the multiple positions, position coordinates can be determined using laser beams. The second data can include coordinates of each of the positions. The method can include moving a robot to each of the multiple positions and transmitting the probe signal from the robot to the base station. The method can include moving an unmanned aerial vehicle to each of the multiple positions and transmitting the probe signal from the unmanned aerial vehicle to the base station. The method can include at each position within the venue, transmitting probe signals to the base station at multiple time periods, and at the base station storing first data representing channel impulse responses corresponding to the probe signals transmitted at the multiple time periods. The method can include determining a position of a device within the venue based on the stored first data and second data. The venue can include at least one of a house, a museum, a building, a shopping mall, an amusement park, a convention center, a hotel, a subway station, a train station, an airport, an underground terrain, a cruise ship, a tunnel, or a region having several structures or buildings.

In general, in another aspect, a method for determining the position of a terminal device is provided. The method includes at a terminal device, sending a radio frequency signal through a multipath channel to a base station that has a storage storing channel impulse responses each associated with one of a plurality of positions; and receiving information about a position of the terminal device from the base station, in which the base station determines the position of the terminal device based on a time-reversed signal derived from the radio frequency signal sent from the terminal device and the stored channel impulse responses.

Implementations of the method may include one or more of the following features. The radio frequency signal can have a frequency in a range between 0.1 GHz to 100 GHz. The radio frequency signal can have a bandwidth equal to or greater than 20 MHz. The method can include determining a coarse position of the terminal device using at least one of Wi-Fi, Bluetooth, or cellular signals, sending information about the coarse position to the base station, and receiving fine position information from the base station. The base station can select a subset of the stored channel responses from among the stored channel responses based on the coarse position information, and determine the fine position of the terminal device based on the time-reversed signal and the subset of stored channel impulse responses.

In general, in another aspect, a method for determining the position of a device is provided. The method includes determining a coarse position of a device in a venue using at least one of Wi-Fi, Bluetooth, or cellular signals; and determining a fine position of the device in the venue based on a time-reversed signal and stored channel impulse responses, each of the stored channel impulse response being associated with a known position.

Implementations of the method may include one or more of the following features. The method can include receiving a probe signal sent from the device, estimating a channel impulse response based on the received probe signal, and determining the time-reversed signal based on a time-reversed version of the estimated channel impulse response. Each stored channel response can be derived from a probe signal sent from the known position associated with the stored channel impulse response.

In general, in another aspect, a method includes at a terminal device, establishing a communication link with a first base station using time-reversal wireless communication; and receiving a first downlink signal from the first base station using time-reversal wireless communication, the downlink signal including first information about a position of the terminal device.

Implementations of the method may include one or more of the following features. Establishing a communication link with a first base station can include sending a channel probing signal from the terminal device to the first base station. The method can include at the terminal device, establishing a communication link with a second base station using time-reversal wireless communication; receiving a second downlink signal from the second base station using time-reversal wireless communication, the second downlink signal including second information about the position of the terminal device; and determining the position of the terminal device based on the first and second information.

In general, in another aspect, a method of determining the position of a device is provided. The method includes at a first device, receiving a probe signal sent from a second device through a multipath channel; estimating a channel impulse response based on the probe signal received at the first device; and applying a time-reversal classifier to determine a position of the second device based on the estimated channel impulse response and stored channel impulse responses, each stored channel impulse response being associated with a known position.

Implementations of the method may include the following feature. The method can include sending information about the position of the second device to the second device.

In general, in another aspect, a method includes at a base station, broadcasting a combined signal that is a combination of multiple downlink signals, each downlink signal having coordinate data associated with a particular position, the downlink signal having a waveform configured to focus at the particular position.

Implementations of the method may include one or more of the following features. The method can include performing a handshake process with a terminal device to provide timing information useful for the terminal device to determine the timing of the broadcast of the combined signal.

In general, in another aspect, a method of determining the position of a terminal device is provided. The method includes at a terminal device, performing a handshake process with a base station to receive timing information useful for determining a timing of a broadcast of a combined signal that is a combination of multiple downlink signals, each downlink signal having coordinate data associated with a particular position, the downlink signal having a waveform configured to focus at the particular position; receiving a downlink signal from the base station, the downlink signal having a waveform configured to focus at the particular position where the terminal device is positioned; and determining coordinates of the position of the terminal device based on the received downlink signal.

In general, in another aspect, a method of determining the position of a device is provided. The method includes determining a coarse position of a terminal device; sending data representing the coarse position to a server; downloading, from the server, information about channel impulse responses associated with positions at or near the coarse position; receiving a channel probing signal from a beacon; estimating a channel impulse response based on the received channel probing signal; determining a time-reversed signal based on the estimated channel impulse response; and determining a fine position of the terminal device based on the time-reversed signal and the downloaded channel impulse responses.

Other aspects include other combinations of the features recited above and other features, expressed as methods, apparatus, systems, program products, and in other ways.

Unless otherwise defined, all technical and scientific terms used herein have the same meaning as commonly understood by one of ordinary skill in the art to which this invention belongs. In case of conflict with patent applications incorporated herein by reference, the present specification, including definitions, will control.

Advantages of the aspects and implementations may include one or more of the following. Time-reversal positioning systems can have low power consumption, good interference reduction, and provide better battery life. The asymmetric architecture of time-reversal positioning systems can reduce the computational complexity and thus the cost of the terminal devices, allowing the positions of a large number of terminal devices to be determined cost effectively. The unique location-specific signatures in time-reversal systems can provide physical-layer security and enhance the privacy and security of users when performing navigation.

DESCRIPTION OF DRAWINGS

FIG. 2 is a diagram of exemplary scattering elements placed around an antenna.

Like reference symbols in the various drawings indicate like elements.

DETAILED DESCRIPTION

Figure 1A:
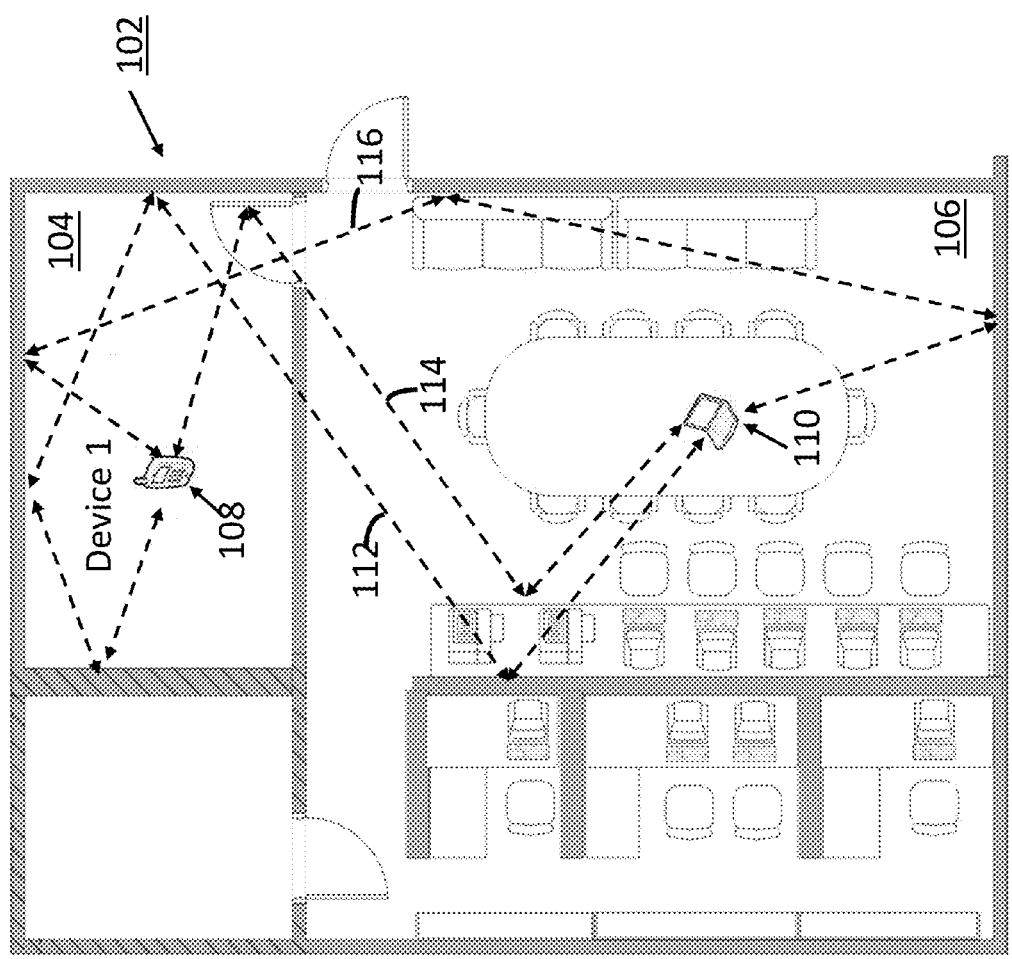
FIG. 1A is a diagram showing an exemplary environment for operating a time-reversal system.

This document describes a positioning system that can achieve meter-level as well as centimeter-level or millimeter-level (or better) position accuracy by using wireless channel response information and time-reversal techniques. Channel responses, also referred to as channel impulse responses (CIRs) and estimated channel responses can be location-specific signatures that characterize a wireless channel between, and therefore the relative position of, two devices. Channel responses may be measured and/or computed and/or may be generated by a combination of measurement and computation. In this disclosure we may also refer to channel responses and received probe waveforms as location-specific signatures.

In an exemplary embodiment of a wireless positioning system, a first device may be referred to as a base station, or an access point, or a locator, and may receive probe waveforms from a second device transmitting channel probe signals. The locator may be able to process a received probe waveform to generate a channel estimate for the channel between the locator and the device as it is positioned. The locator may also have access to a list or a database of previously determined channel responses with corresponding location information or the locator may have access to a tool that can generate predicted channel responses for devices at various locations relative to the locator. The locator may compare a channel estimate from the received probe waveform of the as-positioned device to stored and/or generated channel estimates and may associate a location with the as-positioned device if its estimated channel response is close enough to a stored and/or generated channel response.

In some implementations, a database of channel responses may be established, with each channel response being associated with one of a plurality of positions in a venue. The database of channel responses may be established by any or all or a combination of a measurement, an estimation, a simulation, a calculation, and the like. In an exemplary measurement technique, a device may be placed at various positions in a venue, and at each position, the coordinates of the device may be determined using a reference position measurement system, such as a laser interferometer position measurement system. At each position, the device may send a probe signal, or multiple probe signals, that is/are received and/or detected by a locator. The locator may determine the channel responses based on the received probe waveforms, and may store the coordinates and the corresponding channel responses in a database. Due to reflections from, e.g., floor, ceiling, walls, and objects in the venue, the probe signals may propagate through multiple paths (multipaths) to the locator. When the device is at different locations in the venue, the probe signals transmitted from the terminal device to the locator may propagate through different multipaths, resulting in different channel responses received or detected at the locator. Thus, the information stored in the database may represent a mapping between the detected channel responses and corresponding coordinates in the venue. Later, when a device is placed at a position in the venue, that device may send another probe signal or set of probe signals to the locator. The locator may determine the channel response based on the received probe waveform or waveforms, and may look through the database to identify the positional coordinates that correspond to the most closely matching channel response. The positioning system may be especially useful in indoor environments where signals are subject to multiple reflections. The positioning system may also be especially useful in outdoor environments where tall buildings or various structures or other things may reflect and/or scatter electromagnetic signals creating multipath signals at a locator.

There are multiple exemplary techniques that a locator may use to "look through" a database and "identify" a correspondence between stored and recently determined channel responses. These techniques may include, but are not limited to, processing the stored and/or received data, comparing processed data to thresholds, identifying data that meet certain criteria such as having certain thresholds, and the like. Processing of stored and/or received data may include but is not limited to sampling data, collecting data, eliminating data, performing mathematical functions such as multiplication, convolution, correlation, matched filtering, integration, averaging, addition, subtraction, normalization, and the like, on the data.

In this description, the term "user" may refer to a device. For example, in a system that has multiple devices communicating with a base station, the term "multi-user uplink" may refer to the uplink from multiple devices or from a device with multiple antennas, the term "multi-user downlink" may refer to the downlink to multiple devices or to a device with multiple antennas, and the term "inter-user interference" may refer to the interference among various devices.

In this description, wireless signals may propagate between two devices. In some embodiments, one device may be referred to as a base station, an access point, a locator, a transmitter, a receiver, a transceiver, a source, a router, and the like. In some embodiments, one device may be referred to as a user, a terminal device, a mobile device, a phone, a computer, a tablet, a wearable electronic device such as a watch, a band, a wristband, an ankle band, a belt, a sensor, a piece of clothing and the like, an electronic card, fob, dongle, and the like, a "pinger", a transmitter, a receiver, a transceiver, a device, and the like. In some embodiments, the described roles of one device may be exchanged with the described roles of the other device. In embodiments described as having two devices, or an access point and a terminal device, or similar descriptions, it should be understood that those embodiments may also include more than two devices. For example, embodiments described as having an access point and a device may have multiple devices and/or may have multiple access points. Likewise, embodiments may have multiple base stations, locators, routers, transceivers, sources, transmitters, receivers, mobile devices, phones, tablets, computers, wearable electronic components, cards, fobs, dongles, pingers, devices and the like.

1. Location Specific Signatures

Figure 1B:
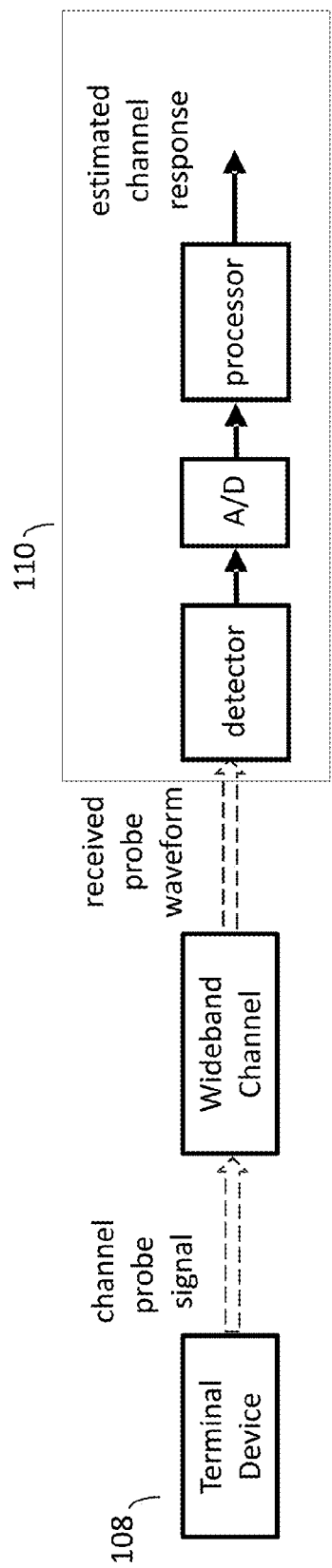
FIG. 1B is a diagram of an exemplary uplink from a terminal device to a receiver in a locator. The locator functionality may be included in a base station, an access point, a router, a modem, and/or a wireless network interface of a wireless network.

In exemplary embodiments, a locator may measure a location-specific signature from a device. Location-specific signatures may be generated in environments having structures or objects that may cause one or more reflections of wireless signals. For example, as shown in FIG. 1A, a venue 102 may have a first room 104 and a second room 106. When a first device 108 in the first room 104 transmits a signal to a second device 110 in the second room 106, the signal can propagate in several directions and reach the second device 110 by traveling through several propagation paths, e.g., 112, 114, and 116. The signal traveling through multiple propagation paths is referred to as a multipath signal. If the signal being transmitted by a first device over a wideband channel is used to probe the channel response, then the signal also may be referred to as a channel probe signal as depicted in FIG. 1B. As the signal travels through the propagation paths (wideband channel), the signal may become distorted. The multipath signal received by the second device 110, which may also be referred to as the received probe waveform can be quite different from the signal transmitted by the first device 108. The received probe waveform is a location-specific signature because it is specific to the relative positions of the locator and the device in that venue or environment.

FIG. 1B shows a representation of a wireless signal being transmitted from a first device 108 to a second device 110 through a wideband channel. In this disclosure, we may refer to the wireless signal sent from one device, in this example device 108, to probe a channel as the channel probe signal. The channel probe signal may traverse a wideband wireless channel and arrive at a second device, in this example device 110, as what we may also refer to as a received probe waveform. This received probe waveform may be received and processed by a receiver comprising at least one antenna and a set of receiver electronics. In exemplary embodiments, the processing of the received probe waveform may yield an estimated channel response for the wideband channel between devices 108 and 110. In embodiments, probe and received signals may be analog signals that are converted to digital signals (and may be digital signals that are converted to analog signals) and may be processed and/or generated using digital signal processors (DSPs), field programmable gate arrays (FPGAs), microprocessors, computers, application specific integrated circuits (ASICs) and the like.

In exemplary embodiments, the received probe waveform may be predicted by convolving the channel probe signal with the channel impulse response, if the channel impulse response is known. The channel impulse response may be an approximation or an estimate of the actual channel impulse response. For example, the estimated channel response may be truncated to a certain channel length that is deemed to be an "accurate-enough" estimate of the channel. In addition, the estimated channel response may be derived from a discretized approximation of a received probe waveform with the time and amplitude resolution of the discretized signal determined to be "accurate enough" for a particular application. The determination of what is "accurate-enough" may depend on the application, the hardware components used in the wireless devices, the processing power of the devices, the allowed power consumption of the devices, the desired accuracy of the system performance, and the like.

If the probe signal transmitted by a first device is a single pulse or impulse signal, then the received probe waveform may be an accurate enough estimate of the channel impulse response and little additional processing other than reception, discretization and storage of the received probe waveform may be necessary to obtain the estimated channel response. If the probe signal transmitted by a first device is a waveform other than a single pulse or impulse signal, then a receiver may need to perform additional processing on the received probe waveform in order to determine the estimated channel response. In an exemplary embodiment, a receiver may detect and discretize a received probe waveform. Analog-to-digital (A/D) converters may be used to perform the discretization. In embodiments, a deconvolution process may use the discretized received probe waveform and a representation of the channel probe signal to yield the estimated channel response. In embodiments, other mathematical functions may be used to yield estimated channel responses.

In an exemplary system, the estimated channel response may be considered a location-specific waveform because it represents the channel response between two devices at certain positions. If either a first device, in this example device 108, or a second device, in this example, 110, is moved, then at least some the multiple propagation paths through which a signal propagates can change, thereby changing the channel response. The characteristics of the estimated channel waveform and how much they change as a function of position and/or orientation may depend on the venue, the environment, and the hardware components in the system, and the like.

For example, a feature of the exemplary system 102 in FIG. 1A is that the devices 108, 110, may use a wider bandwidth compared to conventional radio-frequency based wireless systems, such as those based on Wi-Fi, Bluetooth, or cellular signals. When using a wider bandwidth, the fine structure of the measured channel responses can be more clearly distinguished causing the correlation among channel responses at different locations to decrease. As a result, the localization accuracy may improve as the bandwidth becomes wider. For applications that require less localization accuracy, a location-specific signature based positioning system may use narrower bandwidth signals and/or may provide filters or signal smoothing components in the signal path to increase the correlation of the channel responses at different locations. For applications that require more localization accuracy, a location-specific signature based positioning system may use wider bandwidth signals and/or higher bandwidth and/or higher resolution analog-to-digital and digital-to-analog converters.

In an exemplary embodiment, the position accuracy of a system can be improved by placing scattering elements 232 around a transmitter antenna 230 of a terminal device 108 as shown in FIG. 2. By using the scattering elements 232, the localization accuracy of the positioning system 102 can be improved to 1/30 of the carrier signal wavelength, which is about 2 mm when the time-reversal positioning system 108 is operated at 5 GHz frequency.

In embodiments, different channel probe signals may be chosen to increase or decrease the accuracy of the estimate of the channel response of a wideband channel. In exemplary embodiments, a channel probe signal may be a pulse or an impulse. In addition, the channel probe signal may be a series of pulses with regular, arbitrary or non-regular patterns. The channel probe signal may be a waveform. Waveforms may be substantially square waveforms, raised cosine waveforms, Gaussian waveforms, Lorentzian waveforms, or waveforms with shapes that have been designed to probe the channel in some optimal or desired way. For example, channel probe waveforms may be frequency chirped or may have frequency spectra that are tailored to probe the channel in some optimal or desired way. Probe waveforms may be multiple waveforms with different center frequencies and bandwidths. Probe waveforms may be amplitude modulated, phase modulated, frequency modulated, pulse position modulated or modulated in any combination of amplitude, phase, frequency and pulse position. The waveform may have a temporal width that is substantially equal to the bit duration of the data stream intended to be exchanged over the associated communication channel. The waveform may have a temporal width that is substantially half, substantially one quarter, substantially one tenth, substantially one hundredth, or less than the bit duration of the data stream intended to be exchanged over the associated communication channel. The probe signal/waveform may be a data pattern and may be a repeating data pattern. The probe signal may include packet and/or framing information, synchronization and/or clock recovery information, stream capture information, device ID and network and link layer operating information. The probe signal may have a frequency spectrum that has been tailored for the operating environment and/or the electronic components in the transmitters and/or receivers of the systems. The probe signal may be an estimate of the channel impulse response or may be an altered version of the estimate of the channel impulse response. The probe signal may be designed to compensate for or to accentuate signal distortions imposed by certain electronic components in the transmitters and/or receivers and/or imposed by certain environmental factors.

One exemplary type of simple channel probing signal is a periodic pulse sequence. With such a channel probing signal, the received signal at the locator may be a noisy version of the periodic channel pulse response. In such a case, a time-averaging scheme can be used to suppress the noise and extract the channel response.

In some embodiments, a time-averaging scheme may not provide a reliable measure of the channel response. To improve the performance of the positioning system, a longer sequence of pulses can be used to suppress the noise, though the tracking speed of the system may be slowed by the use of very long sequences. To further improve the performance of the system, a short pseudo-random sequence of pulses can be used as the channel probing signal. In such a case, the received probe waveform at the locator can be the convolution of the pseudo-random sequence with the channel response.

In embodiments, the pseudo-random sequence used as the probing signal may be known by the locator. Then the channel response can be estimated using a correlation-based method where the received signal is convolved with the pseudo-random sequence. In general, the auto-correlation of the pseudo-random sequence may not be an ideal delta function because there can be inter-symbol interference and thus error in the estimated channel response. To avoid such kinds of channel estimation error due to inter-symbol interference, orthogonal Golay complementary sequences, which may have an ideal delta shape for auto-correlation function, can be used to replace the pseudo-random sequence.

During the channel probing phase, the locator may need to obtain channel information that is sufficiently accurate in order to realize required positioning accuracy of the system. In exemplary embodiments, time-reversed versions of the channel response may be used to determine device positions. Such embodiments may take advantage of the focusing effects of time-reversal systems. The process of obtaining channel information in the channel probing phase and getting synchronized in the data transmission phase is referred to as time reversal handshaking Techniques for time-reversal handshaking is described in U.S. patent application Ser. No. 14/183,648, titled "Handshaking Protocol For Time-Reversal System," filed on Feb. 19, 2014, the contents of which are incorporated by reference in their entirety.

In embodiments, processing a received probe waveform may include amplifying or attenuating any portion of the received signal. In embodiments, a channel may be probed once or a channel may be probed more than once. In embodiments, multiple received probe waveforms may be measured, processed, recorded and the like. In embodiments, some channel responses may be averaged with others. In embodiments, some channel responses may be discarded or not recorded. In embodiments, some channel responses may be measured under different environmental conditions and stored. Such stored response signals may be used as reference signals to indicate the environmental conditions associated with the original measurements. In embodiments, a newly measured channel response may be compared to a number of previously stored channel response measurements to determine which previously stored channel response measurement most closely matches the newly measured channel response. Then, the environmental parameters of the most closely correlated previously stored channel response may be associated with the newly measured channel response. In exemplary embodiments, environmental conditions may include, but may not be limited to, temperature, location or placement of objects, location or placement of people, pose of objects, pose of people, location and/or pose of access points, terminal devices, position and/or pose of sensors, position and/or pose of signal reflectors, position and/or pose of signal scatterers, position and/or pose of signal attenuators, and the like.

For example, the change of position of a device may be determined by comparing positions of a device at different times. For example, a device could be mounted on doors or windows of a house and determining a change in position (or a change in estimated channel response) may be used to indicate that a door or window has been opened. Such a system could be used for intruder detection or home monitoring applications. In embodiments, a device mounted on the shirt pocket or wrist of a senior citizen may be used to detect if the senior citizen has fallen to the ground. A device may be attached to a product in a warehouse and used to detect the type and location of the product and update inventory in real-time. A device may be held and/or carried by a person hanging around in a shopping mall and used for targeted advertising or store navigation. In embodiments, a device may be held or carried by a visitor and used for guided tours and/or to provide indoor navigation instructions.

2. Generating Reference Location-Specific Signatures with Known Locations

In exemplary embodiments, reference location-specific signatures for known locations may be compared against recently measured location-specific signatures. If the comparison indicates that those location specific signatures are similar enough to each other, then a location system may determine that the recently measured device is at the known position corresponding to the closely matched reference location-specific signature. In embodiments, there are a variety of ways to determine reference location-specific signatures for known locations.

In one exemplary embodiment, devices in a venue at known locations may send channel probe signals to a locator and the locator may determine the estimated channel responses for devices in those locations and store that data in a database. In some implementations, a mapping between locations in a venue and corresponding reference channel responses may be established experimentally or by measurement prior to the operation of the positioning system and then the mapping is used to determine the locations of the terminal devices within the venue. In some implementations, a mapping between locations in a venue and corresponding reference channel responses is established by computation and then mapping is used to determine the locations of the terminal devices within the venue. In some implementations, a combination of experiments or measurements and computations are used.

In some implementations, the reference channel responses may be established prior to the operation of the positioning system or they may be established on-the-fly or at the same time the positioning system is operating. In embodiments, pre-established reference channel responses may be periodically checked for accuracy or validity, for example by performing some or all of the techniques used to generate the reference channel responses in the first place. In some embodiments, only a few reference channel responses may be checked and/or recalibrated.

In some embodiments, the reference channel responses may be continually expanded and/or improved. For example, certain sensors may be placed throughout a venue at known locations. As users approach the sensors, they may trigger the sensor to communicate with the locator and the users' devices to send a channel probe signal so that the locator may check the accuracy of the current reference channel waveform associated with the sensor position and/or add it to an existing database. In an exemplary embodiment, a pressure sensor in a floor may trigger the positioning system to collect a channel impulse from a device when a person is standing in that position. Then, the locator may store the position of the sensor and the estimated channel response. It is envisioned that many types of sensors may be used in similar embodiments, for example thermal sensors, light sensors, motion sensors, intrusion sensors, cameras and the like. In addition, monitoring systems such as security cameras, NEST thermostats, and the like may be used as sensors in the positioning systems described here.

In embodiments, the hardware components in devices may impact the channel response between the device and the locator. For example, two devices with different antennas and receiver electronics may be characterized by different channel responses between themselves and the locator. In addition to having access to reference channel responses for known locations, the locator may also have access to reference channels for known locations and classes of hardware specifications. In embodiments, a device may communicate with a locator to let it know its hardware configuration so that the locator can choose the appropriate reference channel responses to use to determine the position of the device. As described previously, locators may continually, or periodically, or in response to a trigger event, add to or modify the reference channel responses used to determine device position. For example, a locator may update the reference channel responses when a new type of device sends it a probe signal.

Figure 3:
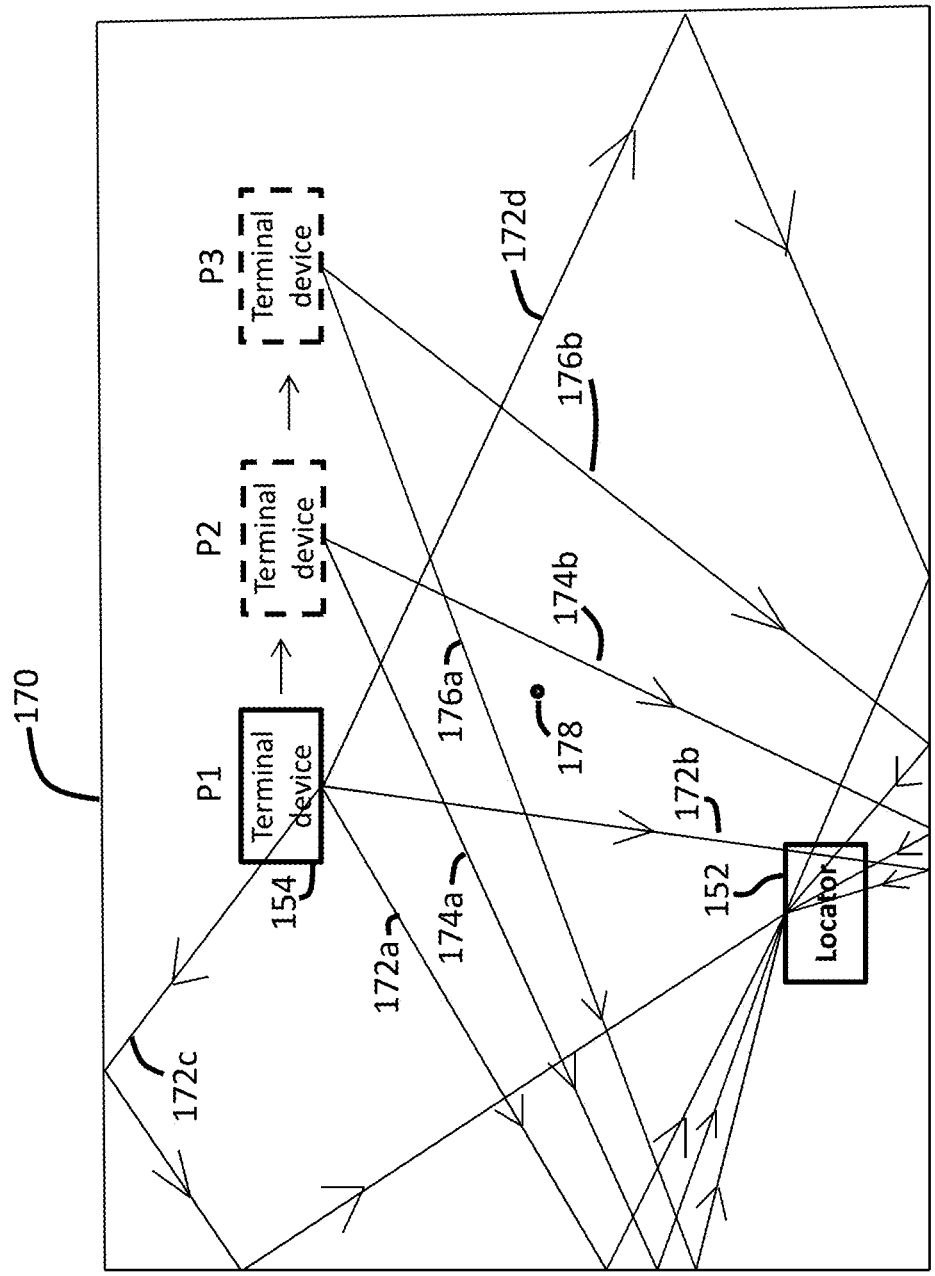
FIG. 3 is a diagram of an exemplary terminal device sending probe signals to an exemplary locator during a training phase.

An exemplary embodiment of a positioning system is shown in FIG. 3. In this embodiment, the system may also be used to build a database of reference location-specific channel responses before or during its operation as a positioning system. A terminal device 154 may be placed at a first position P1 within a venue 170, which can be, e.g., a room, an office, a hall way, a classroom, a house, a hotel, a building, a barn, a museum, a convention center, an amusement park, a stadium, a subway station, a train station, an airport, a shopping mall, an underground terrain, a cruise ship, a tunnel, or a region having several structures or buildings, and the like. The terminal device 154 may send a channel probe signal to a locator 152 through multiple propagation paths, such as 172*a*, 172*b*, 172*c*, 172*d* (only a few paths are shown in the figure, there can be additional paths). The venue 170 may have several objects (not shown in the figure), such as walls and furniture that can reflect and/or scatter the probe signal. The locator 152 may receive the multipath signal and determine the channel response CR1 associated with the position P1.

A reference position measurement system (not shown in the figure), such as laser interferometer position measurement system, may determine the coordinates (e.g., (x1, y1, z1)) of the position P1 relative to a reference point 178. The reference point 178 can be arbitrarily selected, such as the center of the venue 170, or a corner of the venue 170. A Cartesian coordinate system can be used, in which the reference point 178 is at the origin (having coordinates (0, 0, 0)) of the coordinate system, the x-axis, y-axis and z-axis all being mutually orthogonal. Other coordinate systems, such as polar coordinate systems, spherical coordinate systems, geographic coordinate systems, and the like, can also be used. The locator 152 may store the coordinates (x1, y1, z1) of the position P1 and the associated channel response signal CR1 in a database.

In an exemplary embodiment, a terminal device 154 may be placed at a second position P2 within the venue 170 and may send a probe signal to the locator 152 through multiple propagation paths, such as 174*a*, 174*b*. The locator 152 may receive the multipath signal and determine the channel response CR2 associated with the position P2. The reference position measurement system may determine the coordinates (x2, y2, z2) of the position P2 relative to the reference point 178. The locator 152 may store the coordinates (x2, y2, z2) of the position P2 and the associated channel response CR2 in a database.

In an exemplary embodiment, a terminal device 154 may be moved to a third position P3 within the venue 170 and may send a probe signal to the locator 152 through multiple propagation paths, such as 176a, 176b. The locator 152 may receive the multipath signal and determine the channel response CR3 associated with the position P3. A reference position measurement system may determine the coordinates (x3, y3, z3) of the position P3 relative to the reference point 178. The locator 152 may store the coordinates (x3, y3, z3) of the position P3 and the associated channel response CR3 in a database.

In exemplary embodiments, a terminal device 154 may be placed at various positions in a venue so that a base station 152 can determine the channel responses associated with the positions. For example, the positions can be selected from an array of grid points, which can be spaced apart by a distance, such as one wavelength, one-half of the wavelength, or one-tenth of the wavelength of the carrier signal for the probe signal. The grid points may be spaced by, e.g., 0.1 mm, 0.5 mm, 1 mm, 1 cm, 10 cm, 1 m, 10 m, 100 m, or any amount between, e.g., 0.1 mm and 100 m. The grid points may be spaced more densely at places where higher precision is required, and spaced more sparsely at places where lower precision is acceptable. We envision that some applications may require position resolution that is finer than 0.1 mm and that is coarser than 100 m. For example, outdoor positioning systems, or position identification within large structures may have some applications that require resolutions of only a few hundred meters. Precision applications such as identifying surgical materials in a patient or identifying and probing silicon wafers may require resolutions on the order of a few nanometers. The technologies and techniques described in this disclosure can be adapted to meet the requirements for systems requiring from nanometer precision to multi-meter precision.

The grid points may span a three-dimensional space in the venue 170 so that the coordinates along x, y, and z axes can be determined. If the positioning system is mainly to determine the position of devices (e.g., cell phones) held by users walking in the venue 170, the grid points can be spaced more densely for a range of heights corresponding to the normal usage of the devices, e.g., from 1 foot to 6 feet above the floor. Thus, if the venue is a convention center with a 20-foot high ceiling, it may not be necessary to measure the channel impulse responses associated with positions higher than 6 feet above the floor.

In embodiments, the placement of the devices during the measurement phase may be performed by human beings, by robots, by translation stages, by positioning systems and/or under computer control. For example, structures that allow devices to be placed at grid points 5 cm apart may be assembled in a venue. Then a human being or a machine may move the devices to various positions on the structure so that measurements can be taken. For example, the structures may be designed to have a small impact on the channel responses. In other embodiments, robots, including known robots such as Roombas may carry devices used for measurements and may maneuver in a space so that measurements can be taken at various positions. The robot may move under its own control or may be remote controlled or computer controlled. The robot may be equipped with a pole that may hold devices at different distances from the floor so that 3-dimensional mapping of the venue may be achieved.

Any of the techniques described above may be combined with other techniques or used individually.

If the positioning system is used to determine the positions of autonomous vehicles in a factory, and the terminal devices can be mounted on the vehicles, the grid points can be spaced more densely for a range of heights corresponding to the heights of the terminal devices mounted on the vehicles. The grid points can be spaced more densely for a range of x and y coordinates in the plane of motion corresponding to locations that the vehicles are designed to travel.

If the positioning system is used to determine the positions of aerial vehicles (either manned or unmanned aerial vehicles (e.g., drones)) in a warehouse, and the terminal devices are mounted on the aerial vehicles, the grid points may extend over the entire range of heights corresponding to the possible flying heights of the aerial vehicles. The grid points can be spaced more densely for a range of x, y and z coordinates corresponding to locations in which the aerial vehicles are designed to travel.

In some implementations, a mapping between locations in a venue and corresponding channel responses is established by computation, then mapping is used to determine the locations of the terminal devices within the venue. For example, a three-dimensional rendering of a venue may be stored or downloaded to a memory unit associated with the locator. If such data files are not available a prior, then they may be constructed by components at the locator. For example, a three dimensional (3D) model of the venue may be constructed using photos, images, videos, ranging techniques such as laser ranging, optical coherence tomography and the like, echo location, and/or other imaging techniques as well as computer vision and graphical techniques, and then importing the 3D model into a 3D electromagnetic (EM) simulator to generate the database of location-specific estimated channel responses in the environment. The 3D electromagnetic simulator may be a commercially available simulation suite such as COMSOL, ANSYS, MATLAB, NEC, AN-SOF, EMPro and the like. The 3D electromagnetic simulator may be custom developed to run on a locator, a base station, an access point and the like. The parameters such as reflection coefficients of different objects in the venue used by the 3D EM simulator to accurately predict the multiple channel paths between a transmitter and receiver in a venue can be trained and/or calibrated by measuring channel responses at a few locations and comparing the measured and predicted responses. In embodiments, parameters such as reflection coefficients of different objects in a venue may be preloaded and may have multiple values to account for environmental factors such as temperature, humidity, smog, and the like.

The information about a mapping between coordinates and channel responses can be stored in a table, such as Table 1 below.

TABLE 1

| Coordinates (inches) | Channel responses |
| --- | --- |
| (0, 0, 0) | CR1 |
| (0.5, 0, 0) | CR2 |
| (1, 0, 0) | CR3 |
| ... | ... |
| (0, 0.5, 0) | CRn |
| ... | ... |

After the mapping between coordinates and channel responses is established, the mapping can be used to determine the position of the terminal device within the venue 170. For example, the terminal device 154 can be placed at an unknown position in the venue 170, the terminal device 154 can send a probe signal to the locator 152, and the locator 152 can determine the channel response CRx based on the received probe signal. The locator 152 can then compare the channel response CRx with the pre-stored channel responses in the table to identify a closest match. Assume that the pre-stored channel response CR3 most closely matches the channel response CRx. The locator 152 can determine that the terminal device 154 is at the coordinates (1, 0, 0) associated with the pre-stored channel response CR3.

In some embodiments, the locator may determine a value that represents how well a channel response CRx matches one, some or all of the pre-stored channel responses. If the closest matching pre-stored channel response is not close enough to the channel response CRx, then the locator may determine that the terminal device is not in the venue or is not positioned at a location in the database. The locator may make such a determination by requiring that a value that determines how well two channel responses match be above a certain value such as a threshold value. A locator may also make a determination that some channel responses are not worth keeping or not worth using because the value resulting from comparison with other channel responses is below a certain value such as a threshold value. In embodiments, the threshold values may be user settable parameters and/or they may be values that result from calculations, the outputs of sets of instructions, feedback loops, other signals in the system and/or the venue and the like.

The efficacy of using location-specific signatures to determine position can rely on how well channel stationarity is maintained. Channel stationarity requires the channel response to be stationary between when the comparison signatures with known locations are generated and when the channel estimate for a device sending a probe signal to a locator is determined. In exemplary embodiments, the mapping between locations in a venue and corresponding channel responses may be updated, re-measured, re-computed, altered, processed, and the like, to maintain system performance when channel stationarity is not maintained.

Figure 4:
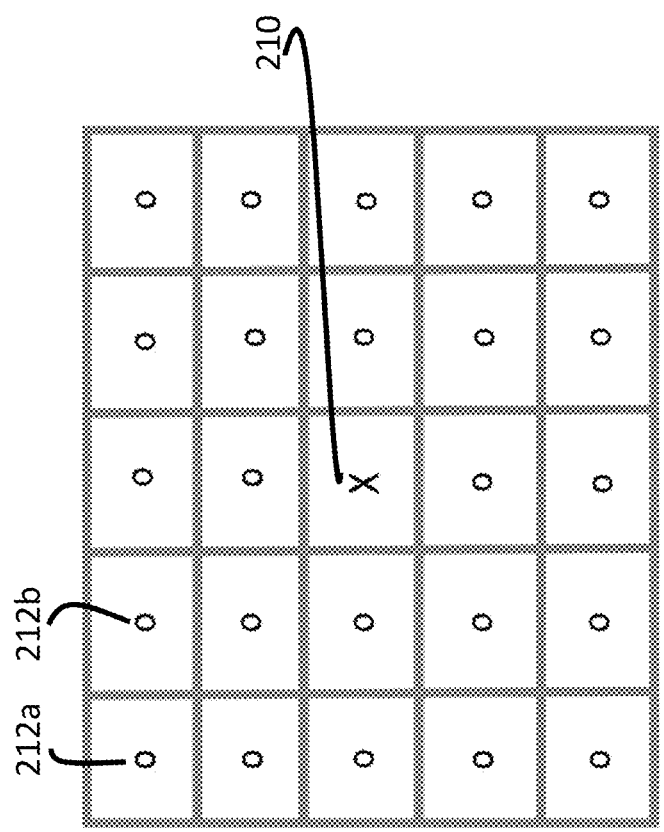
FIG. 4 is a diagram showing a plurality of locations in a venue.

The following describes an exemplary training phase for building a database that has information on the mapping between position coordinates and channel responses. Referring to FIG. 4, in some implementations, for each intended location 210, we may obtain a series of channel responses at a set of locations (e.g., 212*a*, 212*b*) nearby the intended location 210 at different times. Specifically, for each intended location i, we collect the channel impulse response information $$H_i=\{h_{i,1}(t=t_0),h_{i,2}(t=t_0),\ldots,h_{i,K}(t=t_0),h_{i,1}(t=t_1),h_{i,2}(t=t_1),\ldots,h_{i,K}(t=t_1),\ldots,h_{i,1}(t=t_M),h_{i,2}(t=t_M),\ldots,h_{i,K}(t=t_M)\}$$ (Equ. 1)

where $h_{i,j}(t=t_l)$ represents the estimated channel impulse response information at neighbor j at time $t_l$ and $h_{i,i}(t=t_l)$ represents the estimated channel impulse response information at the intended location i at time $t_l$. The database D of channel impulse responses at various locations can be established as:

$$D=\{H_i,\forall i\}$$ (Equ. 2)

Figure 5:
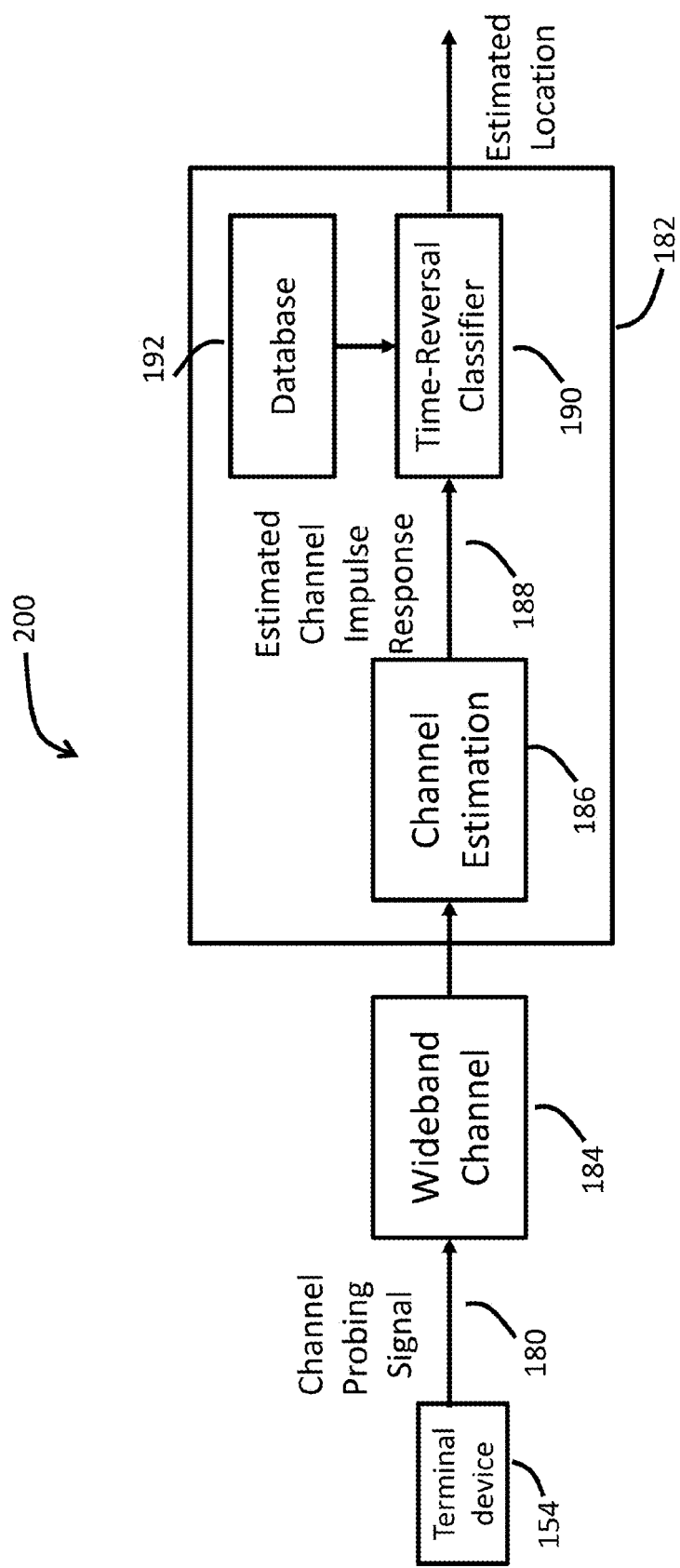
FIG. 5 is a diagram of an implementation of an exemplary time-reversal positioning system.

The following describes the time-reversal classifier 190 of FIG. 5. FIG. 5 shows an implementation of a time-reversal positioning system (TRPS) 200. In this example, a terminal device 154 periodically transmits channel probing signals 180 to a base station or an access point (AP) or a locator 182 through a wideband channel 184. The access point 182 may estimate the channel response (CR) by using a channel estimation component 186. The estimated channel response 188 may be passed through a time-reversal classifier 190 to match to the location information in a database 192 to determine the location of the terminal device 154.

After obtaining the estimated channel impulse response information, the next step is to localize the user (i.e., the terminal device 154) by matching the estimated channel response information with the information stored in the database 192 using classification techniques. Because the dimension of the information for each location in the database 192 is high, classification based on the raw channel response information may take a long time. Therefore, it can be useful to pre-process the channel impulse response information to obtain important features to facilitate the classification.

As described above, because the waveforms received at the locator 182 undergo different reflecting paths and delays for terminal devices 154 at different locations, the channel response can be viewed as a unique location-specific signature. We have determined that an advantageous way to compare estimated channel responses from a device whose position is unknown with reference channel responses associated with known positions, is to time-reverse one of the channel responses and then convolve it with the other channel response. When convolving a time-reverse channel impulse response with the reference channel impulse response in the database 192, or when convolving a channel impulse response with the time-reverse reference channel impulse response, the convolution associated with the channel impulse response at the intended location will produce a large peak signal that can be used to indicate that the two channel responses are closely matched. Convolving the time-reverse version of one of the channel impulse responses, or a version of the channel impulse response related to a time-reverse version, with the comparison channel response, yields a mathematical function that has a large and tightly distributed peak when the impulses are very similar to each other. The peak becomes larger and more tightly distributed when the compared channel responses are more closely matched. In time-reversal imaging and communication systems, the peak that results from convolving a time reverse version of a channel impulse response with the channel itself is known as the spatial focusing effect. In exemplary embodiments, a positioning system 200 may use a time-reversal based dimension reduction approach to extract the effective feature for localization. The following describes an example of such a time-reversal based dimension reduction approach.

For ease of explanation, the collection of channel impulse responses in Equation 1 can be simplified as $$H_i=\{h_i(t=t_0),h_i(t==t_1),\ldots,h_i(t=t_M)\},$$ (Equ. 3)

where $h_i(t=t_l)$ stands for the estimated channel impulse response information of location $p_i$ at time $t_l$. In Equation 3, the channel impulse response information at neighboring positions are not considered.

A time-reversal resonating strength, $\eta(h_1,h_2)$, between two channel impulse responses $h_1=[h_1[0], h_1[1], \ldots, h_1[L-1]]$ and $h_2=[h_2[0], h_2[1], \ldots, h_2[L-1]]$ can be defined as:

$$\eta(h_1, h_2) = \frac{\max_i |(h_1 * g_2)[i]|}{\sqrt{\sum_{j=0}^{L-1} |h_1[j]|^2} \sqrt{\sum_{j=0}^{L-1} |g_2[j]|^2}}, \quad \text{(Equ. 4)}$$

where $g_2 = [g_2[0], g_2[1], \ldots, g_2[L-1]]$ is defined as the time reversed and conjugated version of $h_2$ as follows $$g_2[k] = h_2^*[L-1-k], k=0,1,\ldots,L-1. \quad \text{(Equ. 5)}$$

Equation 4 shows that the time-reversal resonating strength is the maximal amplitude of the entries of the cross-correlation between two complex channel impulse responses, which is different from the conventional correlation coefficient between two complex channel impulse responses where there is no max operation and the index [i] in Equation 4 is replaced with index [L-1]. One of the reasons for using the time-reversal instead of the conventional correlation coefficient is to increase the robustness for the tolerance of channel estimation error. Some channel estimation schemes may not be able to perfectly estimate the channel impulse response, instead, a few taps may be added or dropped during the channel estimation process. In such a case, the conventional correlation coefficient may not reflect the true similarity between two channel impulse responses, while the time-reversal resonating strength described above is able to capture the real similarity by using the max operation and thus increases the robustness. In some embodiments, determining the conventional correlation coefficient may result in precise enough identification of similar channel responses and may be used in positioning systems as described herein. In other embodiments, the time-reversal techniques described and demonstrated below may be preferable.

The following describes an exemplary process for determining the position of the terminal device. Let h be the channel impulse response that is estimated for the terminal device with unknown location. To match h with the locations in a database of reference channel responses, we may first extract a feature using the time-reversal resonating strength for each location. Specifically, for each location $p_i$, we may compute the maximal time-reversal resonating strength, $\eta_i$, as follows $$\eta_i = \max_{h_i(t=t_j) \in H_i} \eta(h, h_i(t=t_j)). \quad \text{(Equ. 6)}$$

By computing $\eta_i$ for all possible locations, i.e., $H_i \in D$, we can obtain $\eta_1, \eta_2, \ldots, \eta_N$. Then, the estimated location, $p_{\hat{i}}$, can be the one that can give the maximal $\eta_i$, i.e., $\hat{i}$ can be derived as follows:

$$\hat{i} = \operatorname*{argmax}_i \eta_i. \quad \text{(Equ. 7)}$$

In an exemplary embodiment, after the locator determines the location of the device, the locator may send the location coordinates of the device, as well as other information such as the type of device, to the device and/or another locator and/or a computer and/or a server in the cloud and/or any type of computing device. In embodiments, information from the device along with its location information may be sent to other systems such as advertising systems, tracking systems, payment systems, notification systems, monitoring systems and the like. Other systems may also send information to the device. For example, the device may receive "on-sale" information for stores in its vicinity and/or for items stored on a wish-list in the phone or based on bank account information on the phone. For example, store selling expensive merchandise may send advertising information to users who have a history of purchasing higher cost items or who have considerable amounts of money in their bank accounts.

Figure 6:
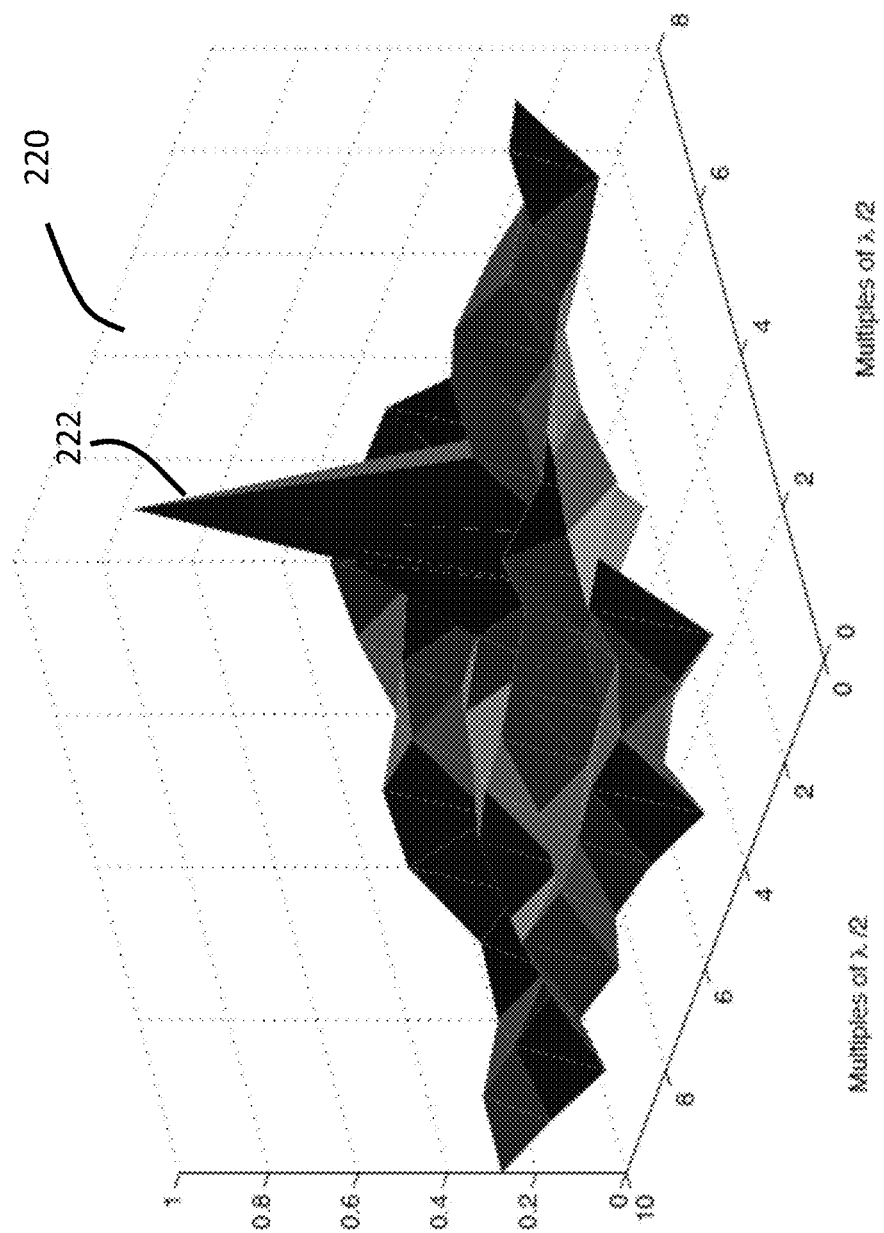
FIG. 6 is a graph showing exemplary results of convolving a time-reverse channel impulse response with pre-stored channel impulse responses.

Referring to FIG. 6, a graph 220 showing an example of the results of convolving an exemplary time-reverse channel impulse response with exemplary reference channel impulse responses in the database 192 for the intended location and locations in the vicinity of the intended location. At the intended location, there is a peak value 222. For the locations other than the intended location, there is no focusing effect and the convolution values are much lower than the peak value. This indicates that the time-reversal based dimension reduction approach can be used to extract the effective feature for localization.

The following describes another example of time-reversal based dimension reduction approach, in which the collection of channel impulse response information in Equation 1 is used. In Equation 1, the channel impulse response information at neighboring locations can be considered. Suppose the estimated channel impulse response is h and the corresponding time-reverse signature is g, then for each location i in the database, we extract the feature $$F_i = \{f_{i,1}(t=t_0), f_{i,2}(t=t_0), \ldots, f_{i,K}(t=t_0), f_{i,1}(t=t_1), f_{i,2}(t=t_1), \ldots, f_{i,K}(t=t_1), \ldots, f_{i,2}(t=t_M), \ldots, f_{i,K}(t=t_M)\} \quad \text{(Equ. 8)}$$

where $f_{i,j}(t=t_1)$ is defined as follows $$f_{i,j}(t=t_1) = \max_n (g * h_{i,j}(t=t_j))[n] \quad \text{(Equ. 9)}$$

After obtaining the feature for each possible location in the database 192, the next step is to estimate the location of the terminal device 154. One straightforward approach is to match the location using the one that can provide the maximal feature value, i.e., $$\hat{i}^* = \max_i \max_{\text{all features in } F_i} F_i \quad \text{(Equ. 10)}$$

Other classification algorithms, such as support vector machine (SVM), can also be used. Specifically, for every location i, we may first use the classification algorithms such as support vector machine to train a classifier $C_i$ by utilizing the collected channel information in the database $H_i$. Then, by applying the classifier $C_i$ to each estimated channel impulse response h, a confidence score $s_i$ can be obtained. The estimated location can be the one with the highest confidence score $s_i$.

From FIG. 6, we can see that the spatial focusing is approximately a half-wavelength focus spot. If the time-reversal positioning system 200 is operated at 5 GHz frequency, then the focus spot is around 3 cm, which means that the time-reversal positioning system 200 can achieve centimeter-level accuracy. As described above, the position accuracy of a system can be improved by placing scattering elements 232 around a transmitter antenna 230 of a terminal device 108 as shown in FIG. 2. By using the scattering elements 232, the localization accuracy of the positioning system 102 can be improved to 1/30 of the carrier signal wavelength, which is about 2 mm when the time-reversal positioning system 108 is operated at 5 GHz frequency.

4. Experimental Results

The following describes experiments that were performed using an experimental time-reversal positioning system that operates at 5.4 GHz band with a bandwidth of 125 MHz. In the experimental system, each device includes an antenna attached to a small cart with a radio frequency board and a computer installed on the cart. We tested the performance of the experimental system in a typical office environment.

Figures 7A, 7B:
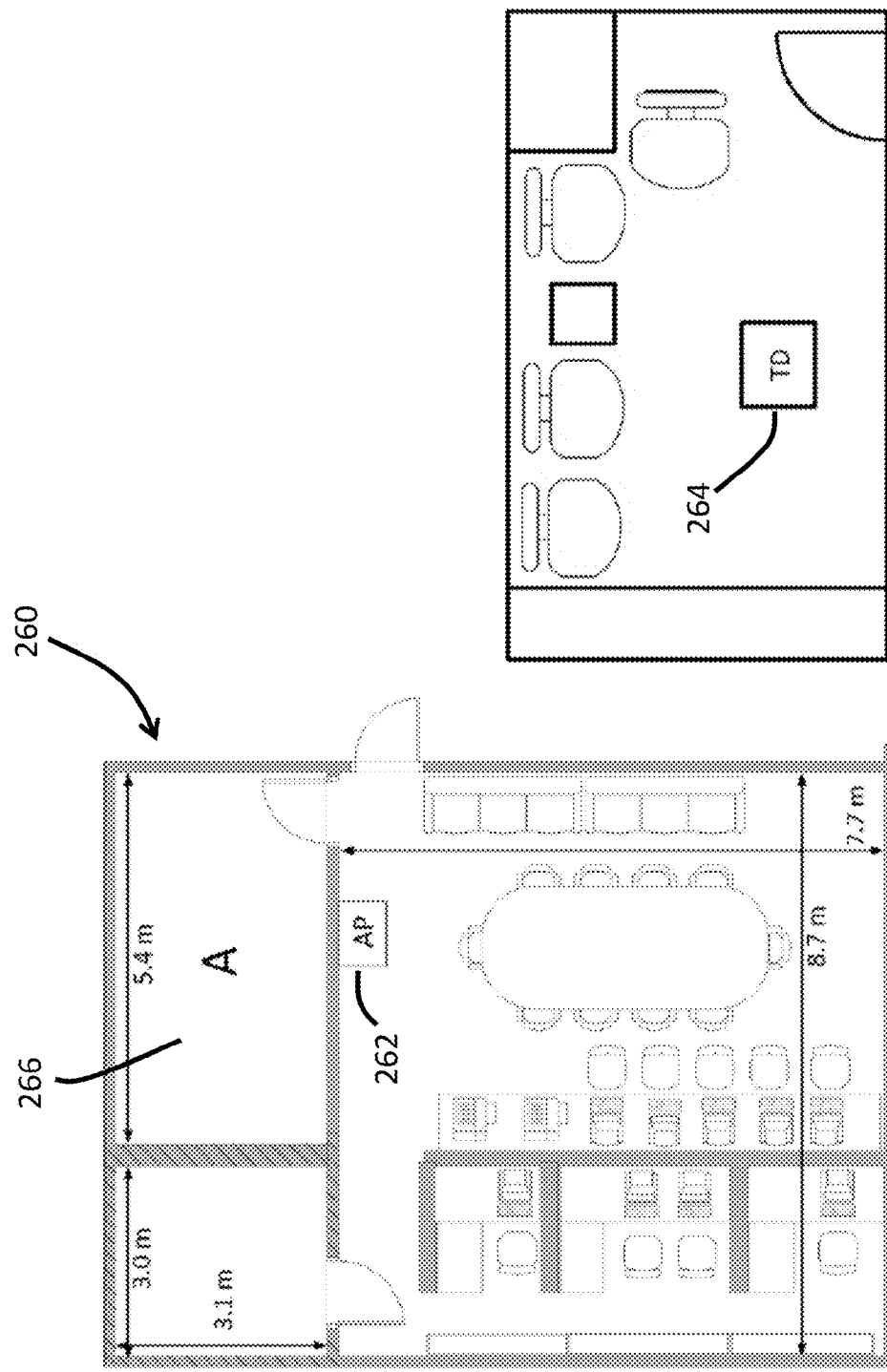
FIGS. 7A and 7B are exemplary floor plans of an office environment.

FIG. 7A shows the layout of the floor plan of an office environment 260 used to conduct the experiments, in which an access point 262, configured as the locator, is situated at the place with the mark "AP" and a terminal device 264 is located in a smaller office room 262 marked as "A". The floor layout of room A is illustrated in FIG. 7B. With such a setting, the locator (AP) 262 is working in a non-line-of-sight condition with respect to the terminal device 264.

The following describes an evaluation of three important properties of the time-reversal system: channel reciprocity, temporal stationarity, and spatial focusing. The channel reciprocity and temporal stationarity are two underlying assumptions of the time-reversal system, while spatial focusing is an important feature for the success of the time-reversal positioning system.

We evaluated the channel reciprocity by examining the channel response of the forward and backward link between the terminal device 264 and the locator 262. Specifically, the terminal device 264 first transmits a channel probing signal to the locator 262 and the locator 262 records the channel response of the forward link. Immediately after that, the locator 262 transmits a channel probing signal to the terminal device 264 and the terminal device 264 records the channel impulse response of the backward link. Such procedures are repeated 18 times.

Figure 8A:
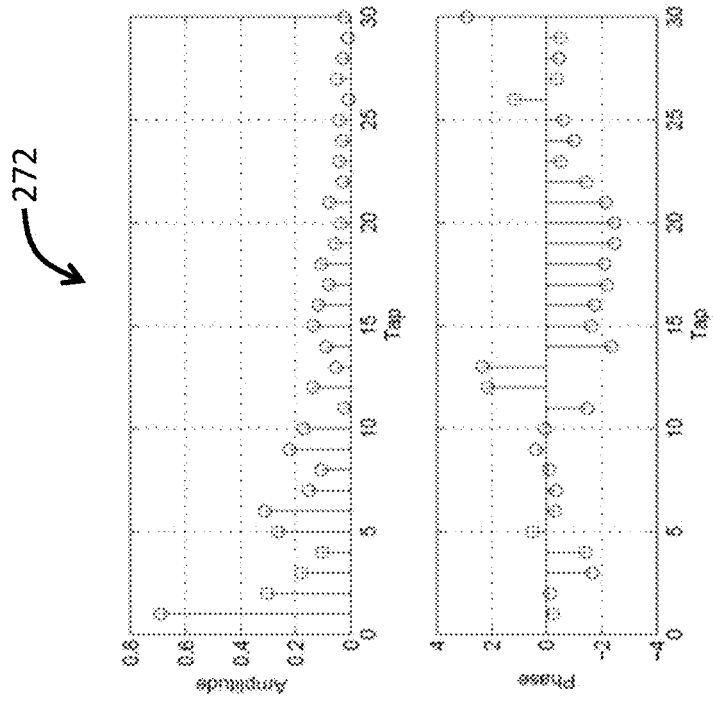
FIG. 8A is a graph showing the amplitude and phase of an exemplary forward channel.
Figure 8B:
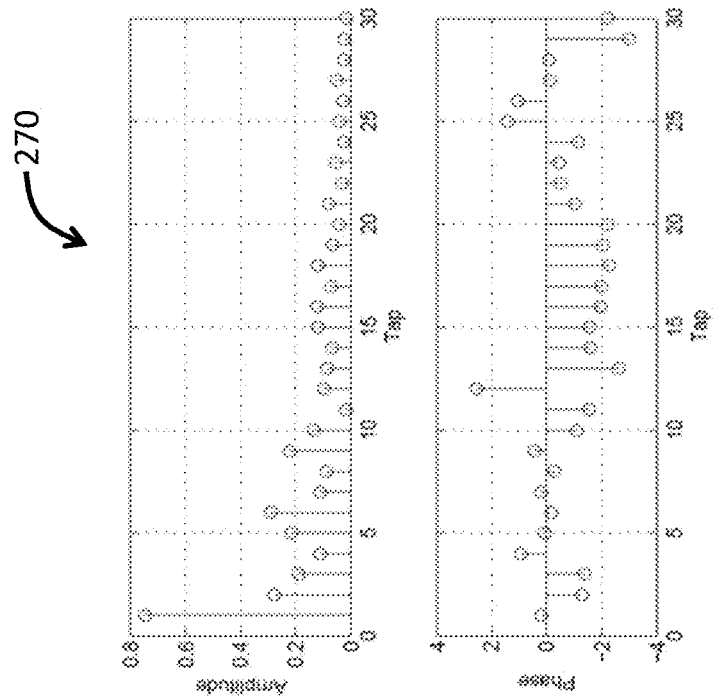
FIG. 8B is a graph showing the amplitude and phase of an exemplary backward channel.

One pair of channel impulse responses for the forward and backward links are shown in FIGS. 8A and 8B. A graph 270 shows the amplitude and phase of the channel impulse response for the forward channel, and a graph 272 shows the amplitude and phase of the channel impulse response for the backward channel. FIGS. 12A and 12B show that the forward and backward channels are very similar.

Figure 9:
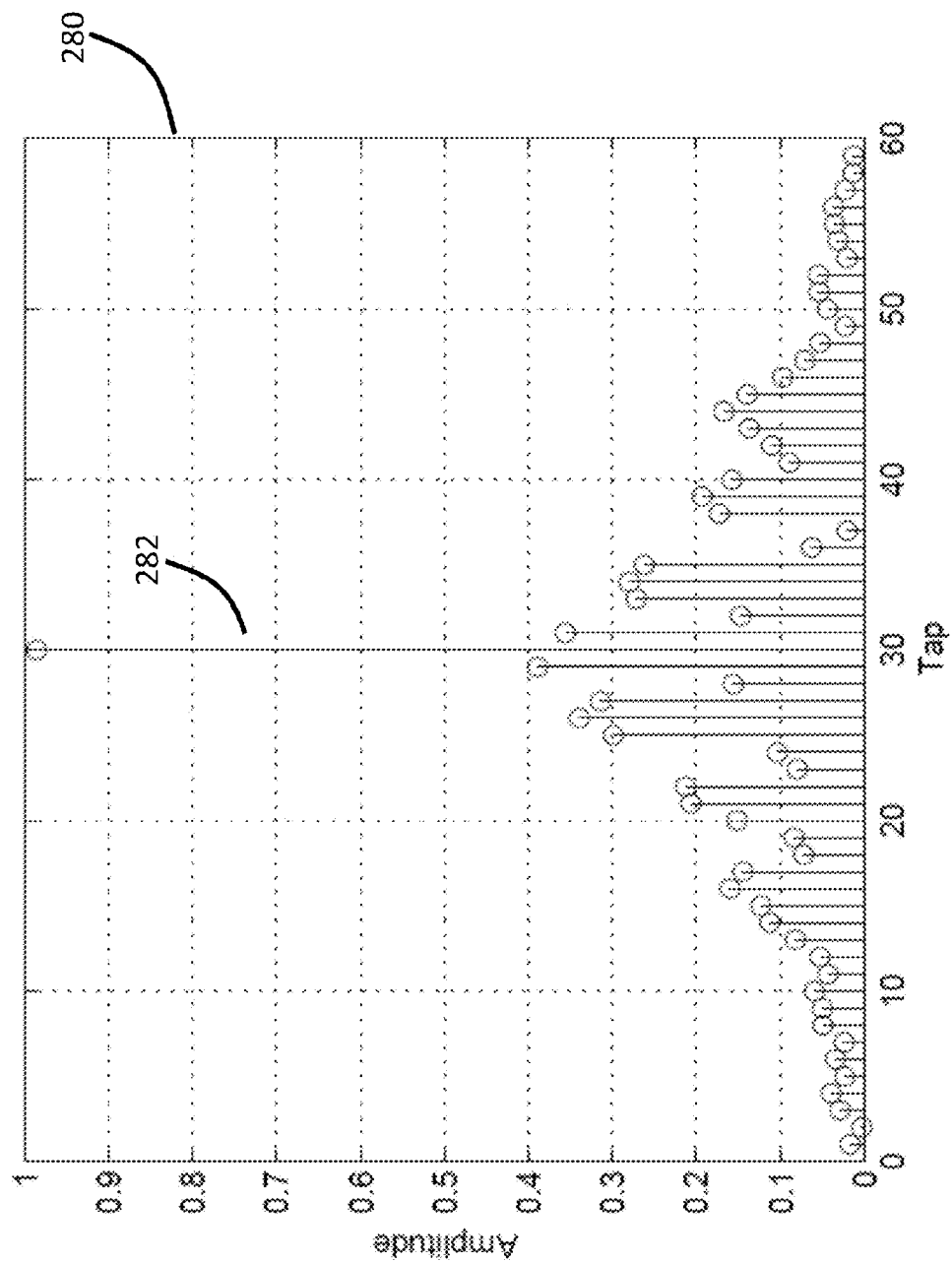
FIG. 9 is a graph showing cross-correlation between the channel impulse response of the forward channel and that of the backward channel.

Referring to FIG. 9, a graph 280 shows the cross-correlation between the channel impulse response of the forward link and that of the backward link. The center tap 282 is the time-reversal resonating strength between the channel impulse response of the forward link and that of the backward link. The graph 280 shows that indeed the forward and backward channels are highly reciprocal.

Figure 10:
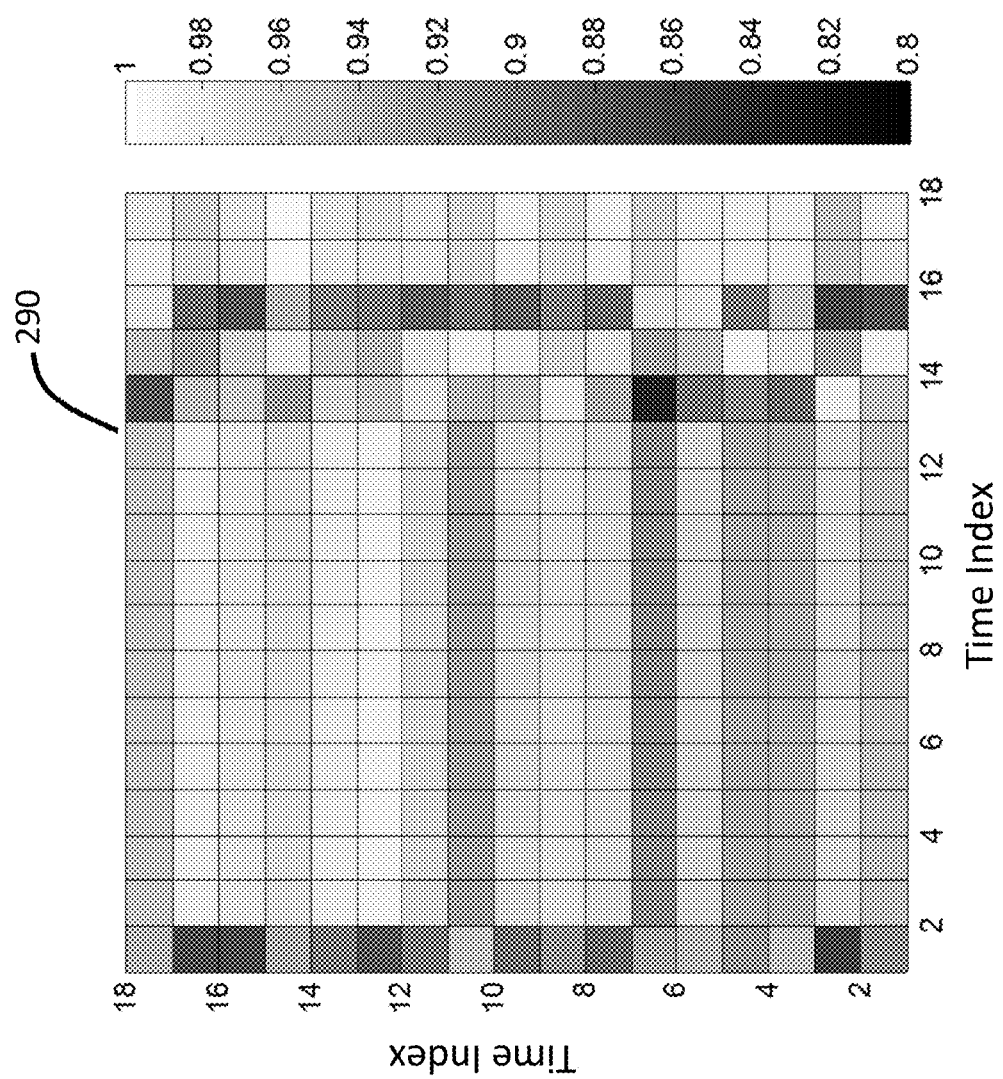
FIG. 10 is a graph showing the time-reversal resonating strength between exemplary forward and backward channel measurements.

Referring to FIG. 10, where the horizontal/vertical axis denotes the index of the 18 collected channel impulse responses of the forward channel and the backward channel respectively and each grid/color block represents the time-reversal resonating strength between each pair of the forward and backward channel impulse responses, a graph 290 shows the time-reversal resonating strength $\eta$ between any of the 18 forward and backward channel measurements with mean $\eta$ to be over 0.95. This result shows that the reciprocity is stationary over time.

We evaluated the temporal stationarity of the time-reversal system by measuring the channel impulse response of the link from the terminal device 264 to the locator 262 under three different settings: short interval, long interval, and dynamic environment with a person walking around. In the short interval experiment, we measured the channel response 30 times every two minutes. For the long interval experiment, we collected a total of 18 channel responses, one every hour interval from 9 a.m. to 5 p.m. over a weekend. For the dynamic environment, we measured the channel responses with a person walking randomly in the room. In this experiment we measured the channel impulse response 15 times, once every thirty seconds.

Figure 11:
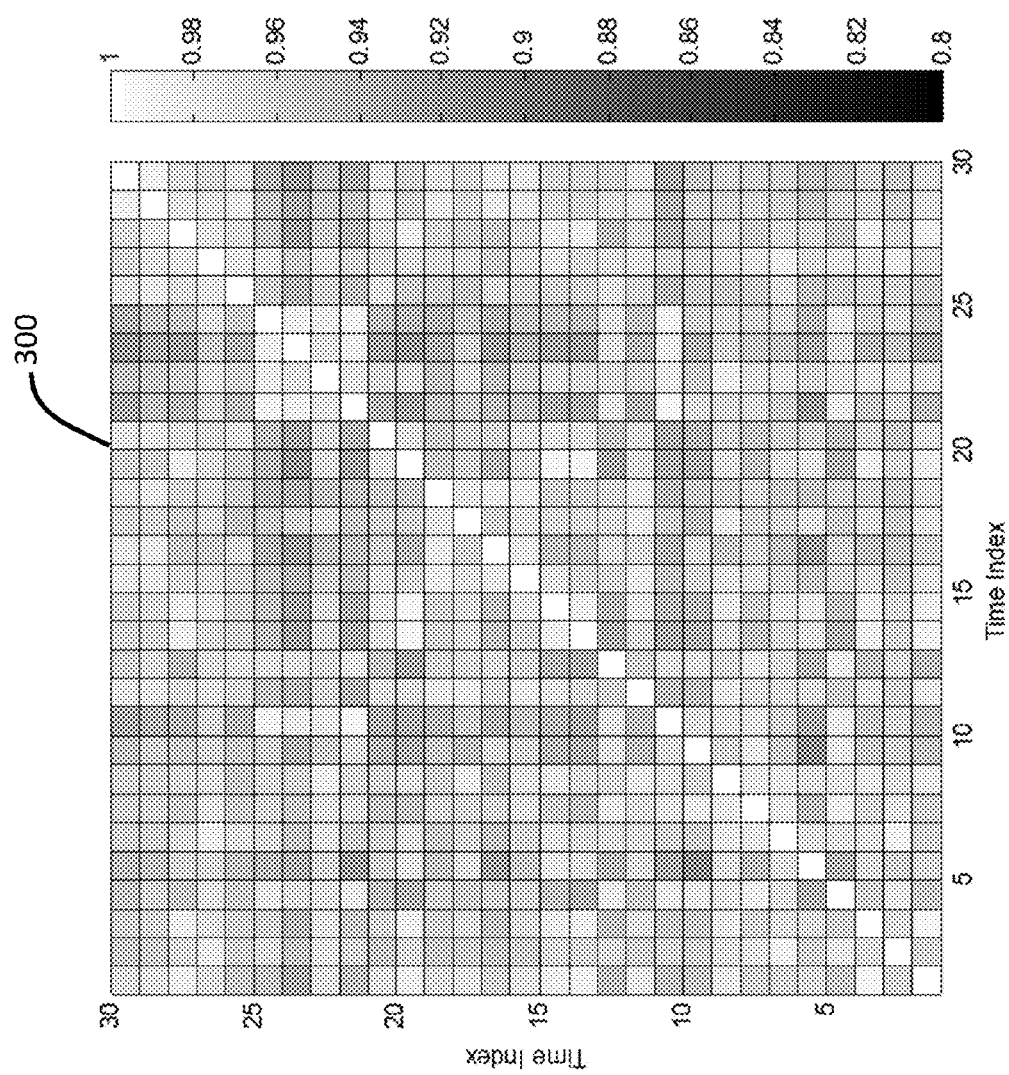
FIG. 11 is a graph showing the time-reversal resonating strength between any two channel impulse responses from exemplary channel impulse responses measured at different short-term time periods.
Figure 12:
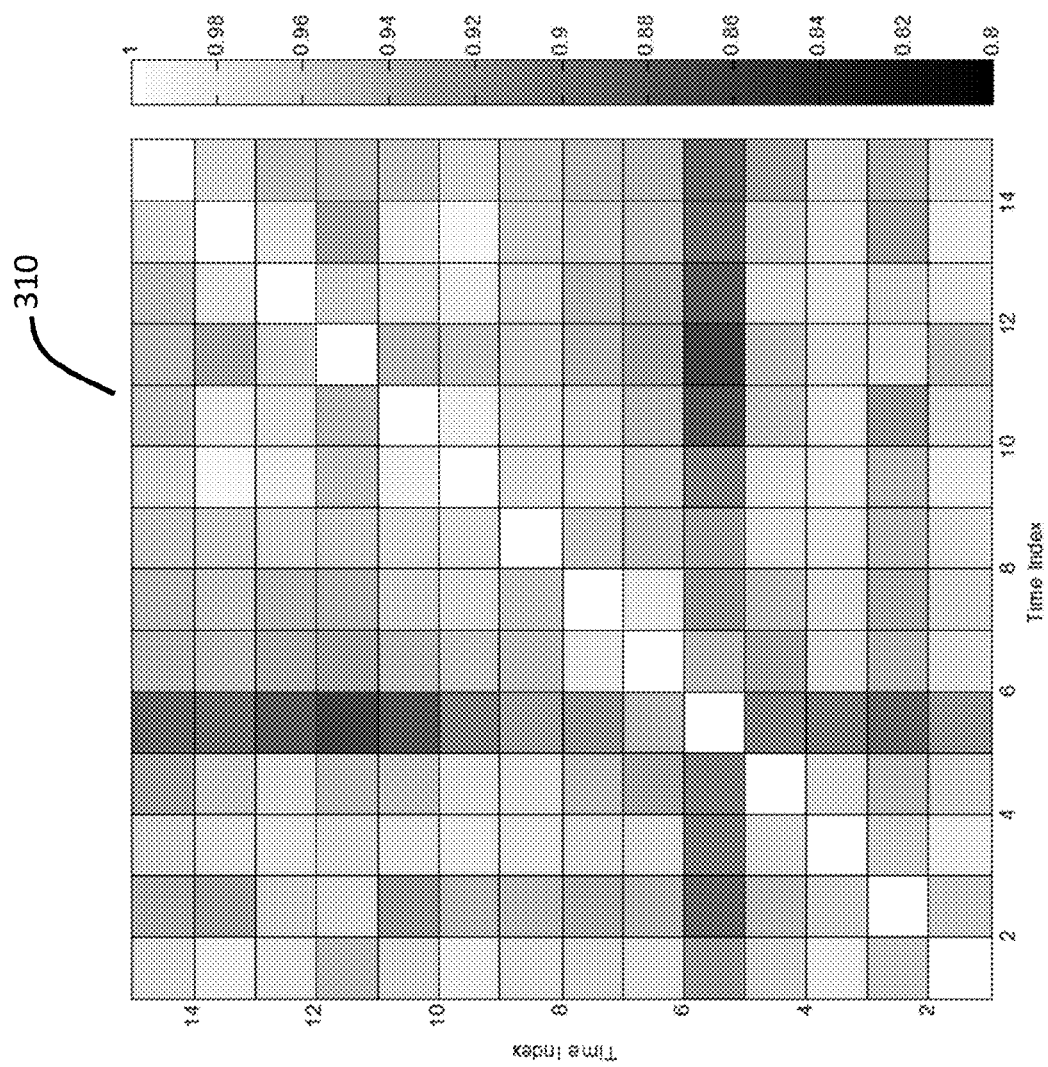
FIG. 12 is a graph showing the time-reversal resonating strength between any two channel impulse responses from exemplary channel impulse responses measured at different long-term time periods.
Figure 13:
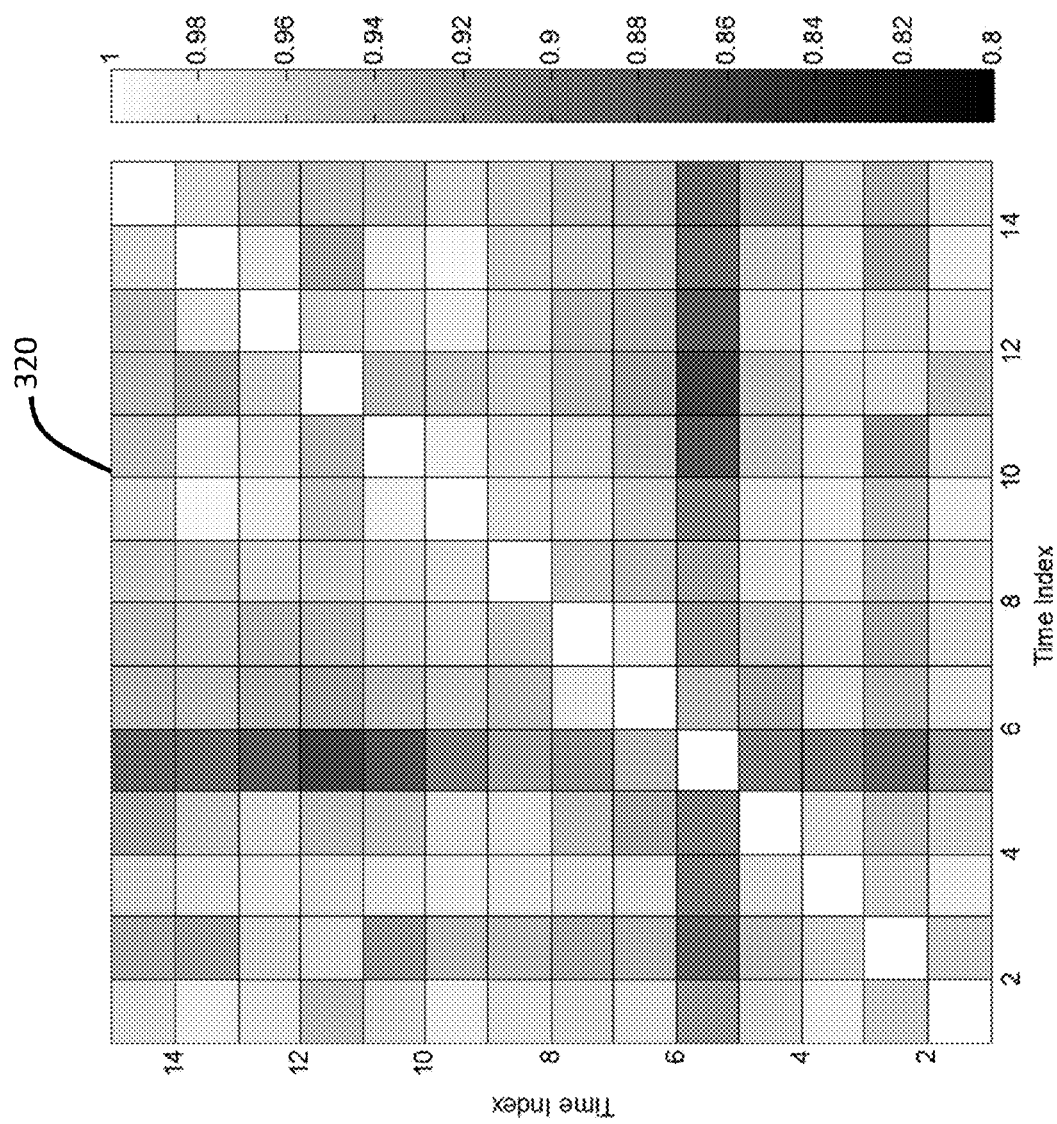
FIG. 13 is a graph showing the time-reversal resonating strength between any two channel impulse responses from exemplary channel impulse responses measured at different short-term time periods under minor environment change.

Referring to FIG. 11, a graph 300 shows the time-reversal resonating strength $\eta$ between any two channel impulse responses from all 30 channel impulse responses of the link between the terminal device 264 and the locator 262 in the short interval experiment. In FIG. 12, a graph 310 shows the time-reversal resonating strength between any two channel responses from the 18 channel responses collected in the long interval experiment. We can see that the channel responses at different time instances are highly correlated for both the short and long interval experiments suggesting that the channel in an ordinary office does not vary much over time, even for relatively long durations between channel measurements. In FIG. 13, a graph 320 shows the time-reversal resonating strength among the 15 collected channel responses under the dynamic environment with a person walking around randomly. The experimental result shows that even with a person walking around, the time-reversal resonating strength remains high among all of the collected channel responses. One of the reasons for the temporal stationarity may be that the multi-paths come primarily from the refractions and reflections of the indoor environment, which appear to be quite stable as long as there is no severe disturbance of the environment (such as modifying walls or partitions, or other office renovations).

The channel impulse response comes from the surrounding scatterers and such scatterers are generally different for different geographical locations. Therefore, the channel impulse response should be location-specific and unique for each location. By using such a unique location-specific channel impulse response, the time-reversal system can focus the transmitted power only to the intended location, which is referred to as the spatial focusing effect of the time-reversal system. We quantify such a spatial focusing effect using the maximum energy that the terminal device 264 can harvest from the locator 262. To evaluate the spatial focusing effect, we conducted experiments by moving the locations of the terminal device 264 within a 1 m-by-0.9 m area in room A. The grid points are 10 cm apart, which leads to 110 evaluated locations in total.

Figure 14:
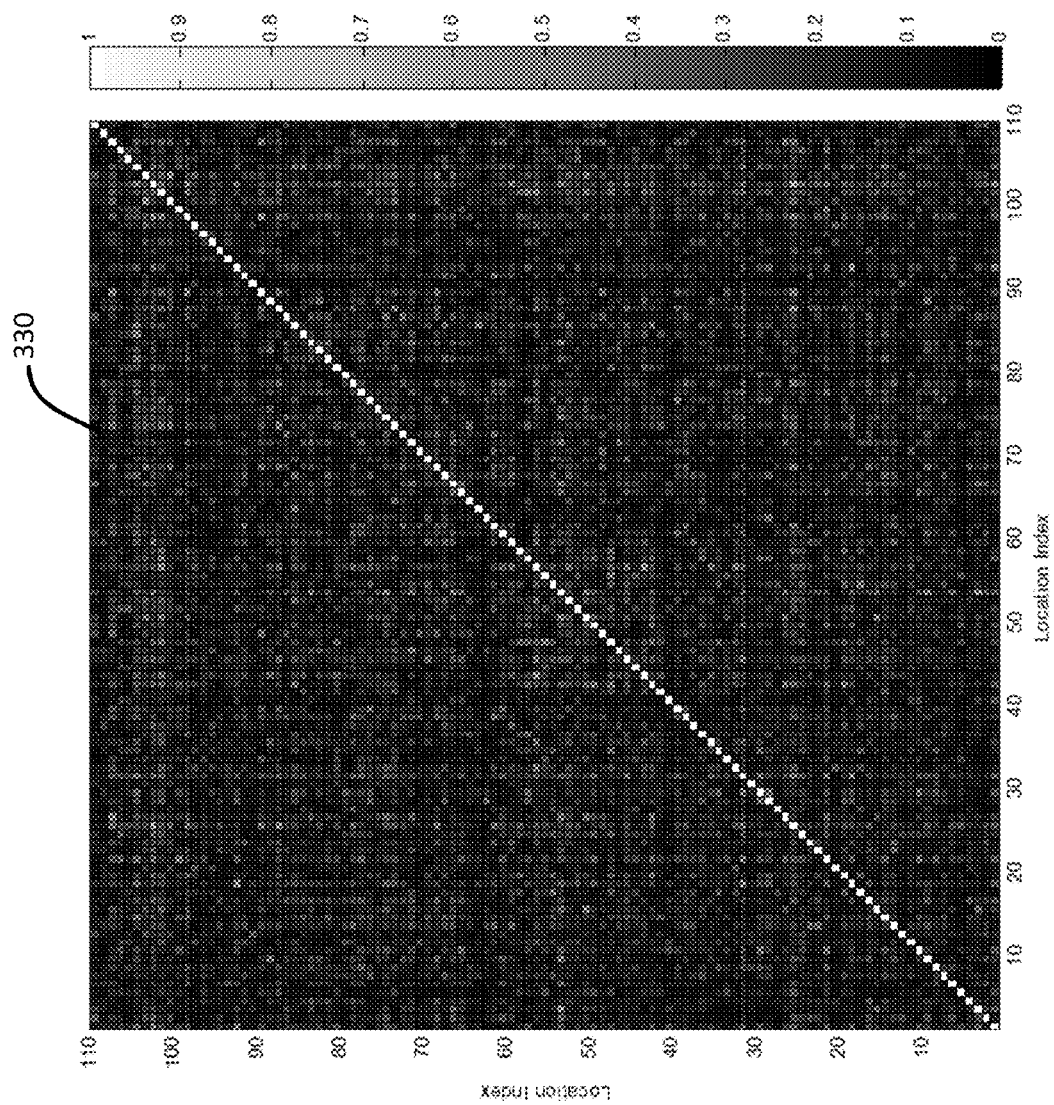
FIG. 14 is a graph showing exemplary focusing gain at various grid points.

We collected the channel impulse responses of all evaluated locations and computed the focusing gain, which is defined as the square of the time-reversal resonating strength, i.e., $\eta^2$, by varying the intended location. Referring to FIG. 14, a graph 330 shows focusing gain, $\eta^2$ of all grid points by moving the intended location within the 1 m-by-0.9 m area. Every dot in the figure stands for one grid point where two neighboring grids points are 10 cm away from each other. The horizontal/vertical axis is the location index with one-dimensional (1D) representation. Each value in (i,j) of the graph 330 represents the focusing gain at location j (location index with one-dimensional representation) when the intended location is i (location index with one-dimensional representation).

Figure 15:
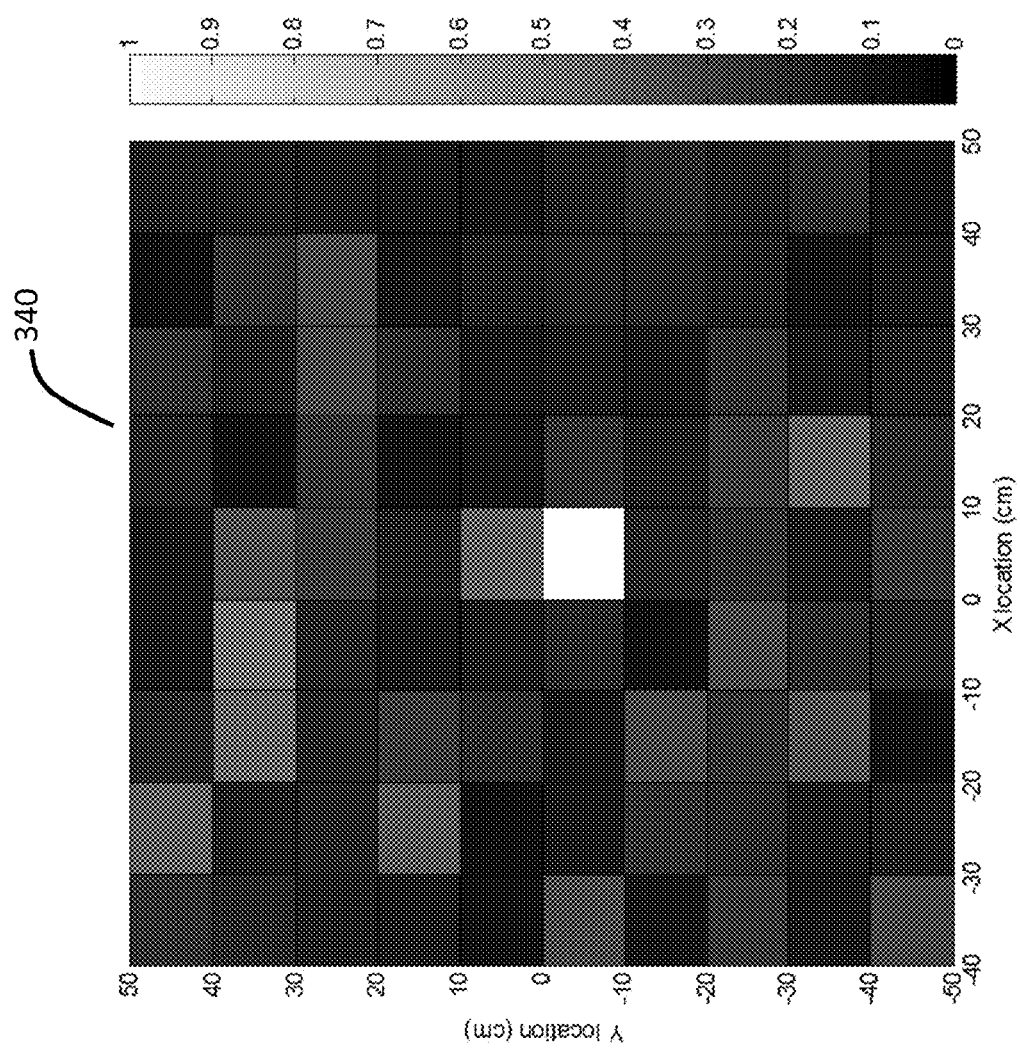
FIG. 15 is a graph showing geographic distribution of the square of the time-reversal resonating strength with the intended location at the center of the area of interest.

The graph 330 shows that the focusing gain at the intended location is much larger than that at the unintended location, i.e., there exists very good spatial focusing effect. The graph 330 shows some repetitive patterns. Such repetitive pattern may be due to the representation of two-dimension locations using a one-dimension index. To better illustrate the spatial focusing effect, we fixed the intended location as the center of the test area and showed in FIG. 15 the spatial focusing by directly using the real geographical locations. Referring to FIG. 15, a graph 340 shows a peak at the center, which indicates a very good spatial focusing performance at the intended location. Similar results were observed for all other intended locations.

Figure 16:
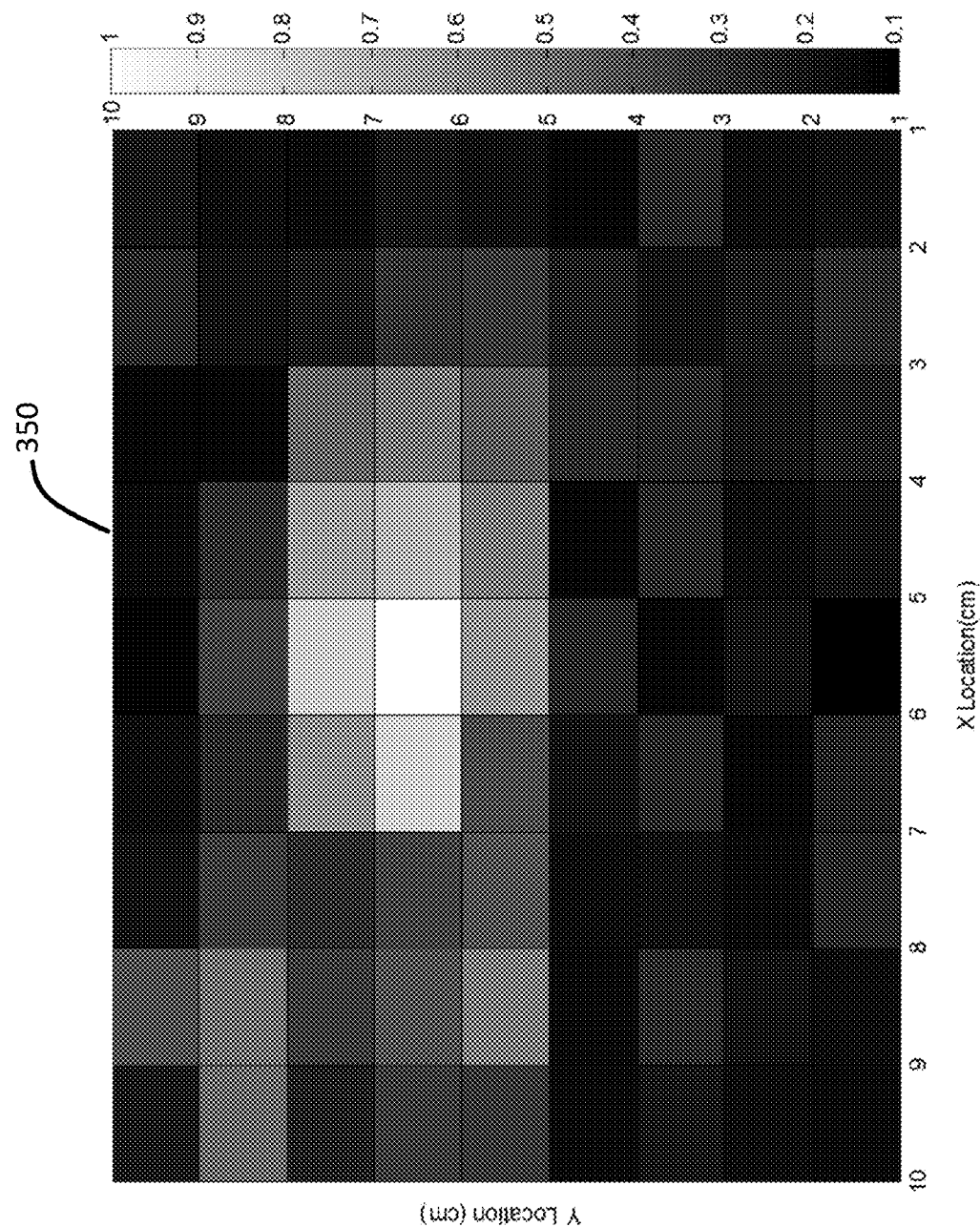
FIG. 16 is a graph showing fine-scale geographic distribution of the square of the time-reversal resonating strength with the intended location at the center of the area of interest.

We further evaluated the spatial focusing effect on a finer (higher resolution) scale with 1 cm grid spacing, and the results are shown in FIG. 16. We can see that there is a reasonably graceful degradation in terms of the spatial focusing effect within a 5 cm-by-5 cm region, and this is consistent with the fact that channels may be uncorrelated at distances of approximately a half wavelength (the wavelength is around 5 cm when the carrier frequency is 5.4 GHz).

From the results shown in FIGS. 8A to 16, we can see that the channel impulse response acts as a signature for the multipath channel between the locator 262 and the terminal device 264, and channel impulse response changes measurably even if the location is only 10 centimeters away.

In the following, we evaluate the performance of the time-reversal positioning algorithm. To evaluate the performance, we use the leave-one-out cross validation. Specifically, we pick each channel response as the test sample and leave the rest as training samples in the database. Then, we perform our proposed algorithm, i.e., the online positioning algorithm, and evaluate the corresponding performance. There are totally 3016 channel responses for the 110 grid points, which leads to a total of 3016 trials. The localization performance is shown in Table 2. From Table 2, we can see that our proposed indoor localization algorithm gives zero errors out of a total 3016 trials, which indicates 100% positioning accuracy in the 1 m-by-0.9 m area of interest. Note that this result is achieved with a single locator working in the non-line-of-sight condition. Moreover, within this online positioning phase, the positioning algorithm just uses one channel response to estimate the location of the TD.

TABLE 2

Localization performance with 10 cm localization accuracy

| Number of Trials | 3016 |
|---|---|
| Number of Errors | 0 |
| Error Rate | 0% |

From the experimental results and discussions above, we can see that the time-reversal positioning system provides a good solution to the problem of determining positions in a multipath-rich environment, such as an indoor environment. The time-reversal positioning system can achieve a high localization accuracy using a simple algorithm and with low infrastructure cost. Some of the features of the time-reversal positioning system are summarized below.

The experimental results show that, with a single locator working in the 5.4 GHz band under the non-line-of-sight condition, the time-reversal positioning system can achieve centimeter localization accuracy with a low error rate. The accuracy can be improved by, e.g., increasing the resolution of the database (i.e., reducing the distance between measurement points when establishing the channel impulse response database).

Based on the time-reversal technique, the matching algorithm in the time-reversal positioning system is simple, which just computes the time-reversal resonating strength between the time reverse of the estimated channel impulse response and that in the database.

A single locator can achieve a high localization accuracy even under the non-line-of-sight condition. The infrastructure cost of the time-reversal positioning system can be low. The localization performance can be further improved by using multiple access points.

The time-reversal positioning system is not limited to the 5.4 GHz band. It can also be applied to the ultra-wideband (UWB) band with a larger bandwidth, which may result in higher localization accuracy.

Additional Embodiments

A time-reversed version of the estimated channel response may be used for communication in addition to positioning applications. In an exemplary communication system embodiment, where a second device 110 intends to transmit a data stream to a first device 108, the second device 110 can use a normalized time-reversed conjugate version of the channel response as a basic transmission waveform. The second device 110 can load (or encode or modulate) the data stream on the basic transmission waveform, and transmit the signal through the wireless channel. The signal received at the receiver, in this example 108, can be described as the convolution of the transmitted signal and the channel impulse response, plus additive white Gaussian noise. In this exemplary embodiment, a first device 108 may perform a simple adjustment to the received signal and down-samples it to recover the data stream transmitted by the second device 110.

Figure 17:
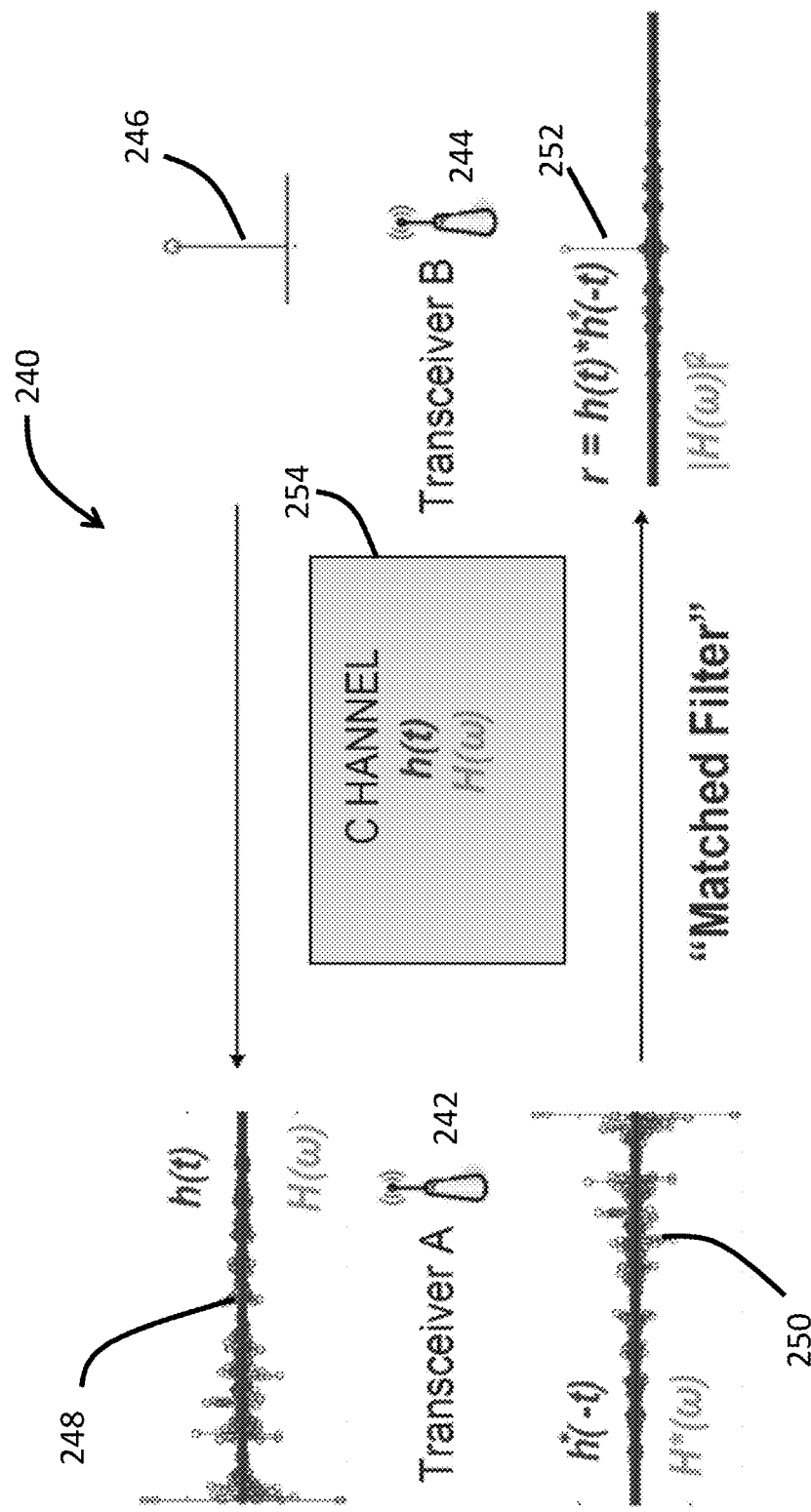
FIG. 17 is a diagram illustrating the time reversal signal processing principle.

FIG. 17 shows a view of operational principles of an exemplary time-reversal communication system. When a transceiver A 242 wants to transmit information to a transceiver B 244, the transceiver B 244 first sends a probe signal 246 to the transceiver A 242 through a multi-path channel 254. This may be referred to as the channel probing phase. The probe signal 246, after propagating through the channel 254, may become a waveform 248 that is received at the transceiver A 242. The transceiver A 242 time-reverses (and conjugates if the signal is complex) the received waveform 248, and uses a time-reversed version 250 of the waveform 248 to transmit information back to the transceiver B 244. This may be referred to as the time-reversal transmission phase.

In an exemplary time-reversal (TR) system, when channel reciprocity and stationarity are fairly well maintained, an emitted time-reversal signal 250 may retrace the incoming paths and form a constructive sum of signals at the intended location (i.e., the location of the transceiver B 244), resulting in a peak 252 in the signal-power distribution over the space, i.e., spatial focusing effect. Because time-reversal uses the multipaths as a matched filter, the transmitted signal may be focused in the time domain as well, which is referred to as the temporal focusing effect. Moreover, by using the environment as matched filters, the transceiver design complexity can be significantly reduced.

Referring again to FIG. 17, a time-reversed waveform 250 can be generated by reversing the channel response waveform 248 with respect to time. If the second device 110 sends a signal having the waveform 250, the signal will propagate in various directions, including through propagation paths 112, 114, and 116 (in reverse direction relative to the propagation direction of the probe pulse signal), and reach the first device 108. In an idealized situation, the multipath signal received at the first device 108 would form a pulse signal that is similar to the pulse signal previously sent from the first device 108 to the second device 110.

Both real time-reversal communication and positioning systems may differ from "idealized" systems in a number of ways. For example, in embodiments, the number of multipath signals that can be captured at a first device 108 may be a subset of the total number of multi-paths generated by the environment. In embodiments, a first device may detect, digitize (or sample) and process a portion of a transmitted signal that travels directly along a line-of-sight between a first device and a second device. In embodiments, a first device may detect, digitize (or sample) and process one or more multi-path signals that arrive at the device within a time delay of the direct, line-of-sight signal. Such a time delay may be referred to as a time delay window or a channel length. In embodiments, the time delay window may be variable and may be controlled by hardware and/or software in a device. In embodiments, a first device may detect, sample and process one or more multi-path signals with certain amplitudes. In embodiments, the certain amplitude may be an amplitude above a threshold amplitude and the threshold amplitude may be fixed or may be variable and may be controlled by hardware and/or software in a device. In exemplary TR systems, different devices my collect different numbers of multipath signals and may have different settings for the time delay window or channel length, and/or amplitude threshold.

In embodiments, analog-to-digital converters (ADCs) and digital-to-analog converters (DACs) may be used in interfaces between analog and digital circuitry. In embodiments, the ADCs and/or DACs may utilize up to two (2) bits of resolution, up to four (4) bits of resolution, up to six (6) bits of resolution, up to eight (8) bits of resolution, up to ten (10) bits of resolution, up to twelve (12) bits of resolution or more bits of resolution. In embodiments, the ADCs and/or DACs may adaptively adjust the number of bits of resolution that are being used to digitize a signal. In exemplary embodiments, an ADC or DAC in a device may utilize 4 bits of resolution under normal operating conditions but may increase the number of bits of resolution to improve the temporal and/or spatial focusing effect of the TR system. In other exemplary embodiments, an ADC or DAC in a device may utilize 8 bits of resolution under normal operating conditions but may decrease the number of bits of resolution to reduce the power utilization of the device. The number of bits of resolution of either or both of ADCs and DACs may be an adjustable parameter in a TR transmitter and/or receiver. The number of bits of resolution of either or both of ADCs and DACs may be adjusted by a feedback loop and/or under software control. The number of bits of resolution may be a user settable parameter and may be accessed and set using a user interface and/or and application running on a device of a TR system.

In embodiments, TR systems may benefit from analog-to-digital converters (ADCs) and digital-to-analog converters (DACs) with relatively high sampling rates. For example, a TR system with a 125 MHz receiver bandwidth might use ADCs and DACs with sampling rates higher than 250 MHz. In a demonstration system we have used to investigate the spatial focusing effect of TR, we used ADCs and DACs with quoted sampling rates of 500 MHz. Broader band operation of TR systems may require ADCs and DACs with GHz sampling rates.

Note that in exemplary embodiments, devices may have single input antennas or receivers and/or single output antennas or transmitters. In embodiments, devices may have multiple input antennas or receivers and/or multiple output antennas or transmitters. In this disclosure, it should be understood that first and second devices may include single or multiple input and/or output antennas and/or single or multiple receivers and/or transmitters. Different antennas, transmitters, and/or receivers may be designed to operate at similar carrier frequencies or in similar regions of the electromagnetic spectrum or they may be designed to operate at different carrier frequencies or in different regions of the electromagnetic spectrum. Antennas, transmitters and/or receivers may have different bandwidths and may comprise different hardware components, circuits, processors, software, firmware and the like.

In multiple antenna, transmitter and/or receiver embodiments, the multiple antennas, transmitters and/or receivers may operate completely independently of each other or they may operate in conjunction with each other. In embodiments, a subset of antennas, transmitters and/or receivers in a device may operate independently of others or in conjunction with others. In multiple antenna, transmitter and/or receiver embodiments, the multiple antennas, transmitters and/or receivers may share certain hardware components and software code. In multiple antenna, transmitter and/or receiver embodiments, the multiple antennas, transmitters and/or receivers may operate simultaneously, independently or in a synchronized manner. For example, some or all of the antennas, transmitter and/or receivers may utilize frequency hopping techniques and the frequency hopping may be coordinated amongst the various antennas, transmitters and or receivers.

In this disclosure, the use of the term device and/or terminal device may mean a device with single or multiple transmitters and with single or multiple receivers and with single or multiple antennas. The term receiver may mean a single receiver or multiple receivers and a single antenna or multiple antennas. The term transmitter may mean a single transmitter or multiple transmitters and a single antenna or multiple antennas. In some cases, a device may be any of a transmitter, a receiver and a transceiver (a combination of a transmitter and a receiver).

In all of the disclosed embodiments, it is envisioned that wireless networks using the disclosed technology may comprise at least two devices and such networks may comprise three or more devices. For the sake of explanation and in certain embodiments, devices may be identified as transmitters or receivers, but it should be understood that the devices could also be transceivers, radios, software radios, handsets, mobile devices, computers, routers, modems, and the like. Devices may be fully bi-directional or they may be configured to have more functionality as transmitters or as receivers or to support different data rates, protocols, power levels and the like in the transmit and receive modes. Multiple access points may communicate back and forth with each other and multiple terminal devices may communicate back and forth with each other. In some embodiments, an access point may be a fixed module that allows wireless devices to be connected to a wired or another wireless network. Access points may support a wide variety of networking protocols and/or transmission protocols and may include or may be connected to additional computing engines and/or devices to achieve enhanced performance. Access points may be routers, modems, transmitters, repeaters, and the like and may be the signal source to support hot spots, local area networks, cells, microcells, nanocells, picocells, femtocells, and the like. Access points may support multiple wireless transmission standards, formats and protocols including, but not limited to time-reversal protocols, WiFi, 802.11xx, Bluetooth, Bluetooth LE, Zigbee, Near Field Communications (NFC), infrared communications, orthogonal frequency division multiple access (OFDMA), code division multiple access (CDMA), and the like.

In exemplary devices probe signals may be wirelessly transmitted using either omnidirectional or directional antennas, as long as the probe signal produces a multipath channel response signal at the locator. In some implementations, placing reflectors around an antenna to purposely reflect or scatter a signal in many directions may increase the number of propagation paths and may improve signal quality in a time-reversal system.

Figure 18:
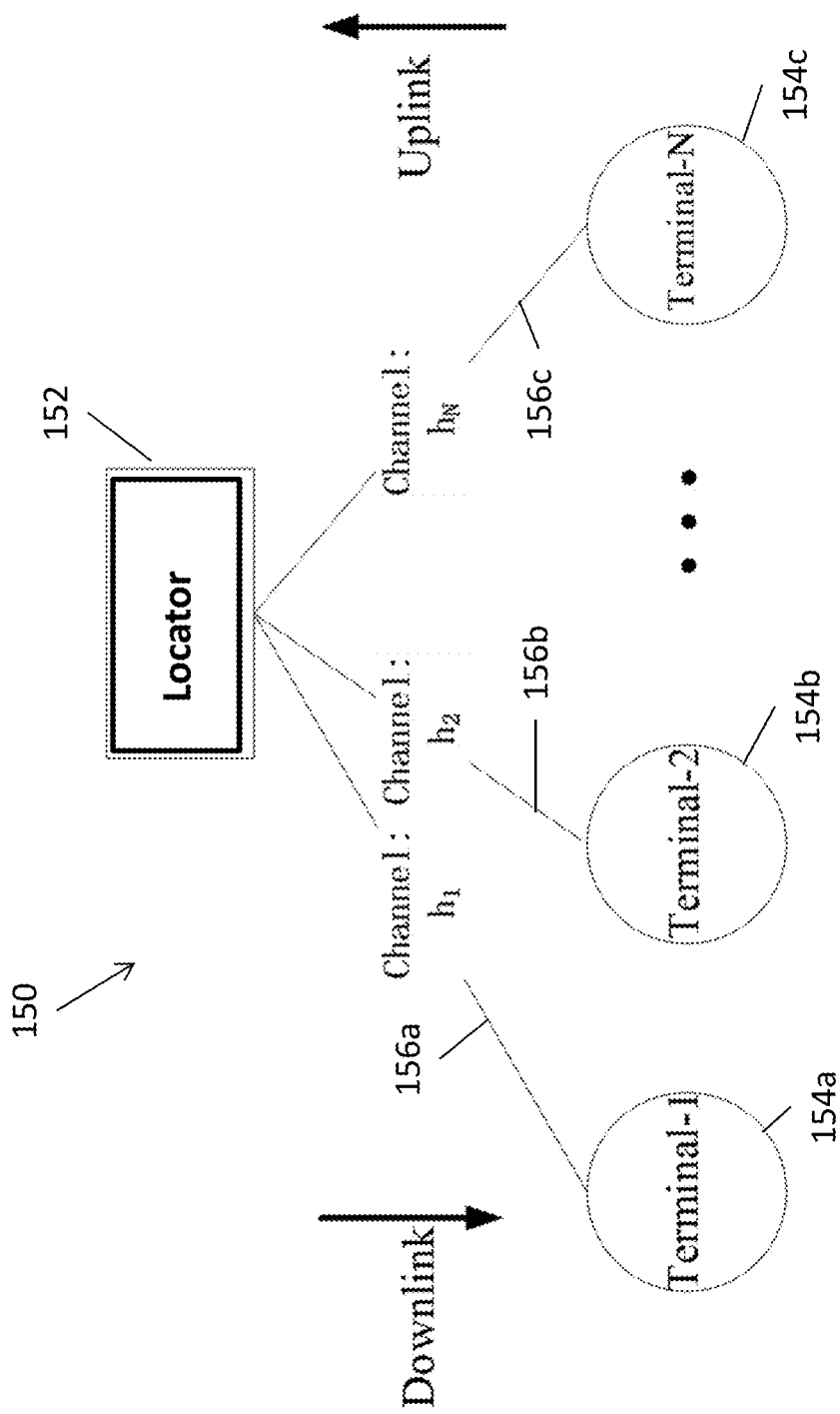
FIG. 18 is a diagram of an exemplary multi-user time reversal communication and positioning system.

Note that multiple devices can be communicating simultaneously with a locator or access point or base station. In exemplary embodiments, a single locator may be used to determine the position of more than one device. For example, FIG. 18 shows an exemplary multi-user time reversal positioning system 150 that includes a locator 152 and multiple terminal devices (e.g., 154a, 154b, 154c, collectively 154). Each of the terminal devices 154 is associated with a multipath wireless channel (e.g., 156a, 156b, 156c, collectively 156) between itself and the locator 152. Each multipath wireless channel 156 in the figure represents two or more multiple signal propagation paths between the corresponding terminal device and the locator. In some implementations, all the devices (including the locator 152 and the terminals 154) can operate at the same frequency band, and the system operates in multipath environments. For the downlink, the locator 152 can send multiple messages (either independent or non-independent) simultaneously to multiple selected terminals 154. In this example, the base station 152 can transmit data to the terminal devices 154a, 154b, 154c, and also determine the positions of the terminal devices 154a, 154b, and 154c.

The terminal device 154 can be any movable device, such as a mobile phone, a camera, a laptop computer, a tablet computer, a wearable computing device, a pair of eyeglasses, a helmet, a goggle, a car, a personal transportation device, a robot, a robotic arm, an unmanned aerial vehicle, a radio, an audio player, a health monitor, a headphone, an object tracker, a name tag, a clothing tag, a merchandise tag, a packaging box, a pen, a stylus, a watch, a bracelet, a necklace, or a cart. The terminal device 154 can also be a module that is attached to any of the movable devices described above. For example, the terminal device 154 can be a dongle attached to a movable electronic device.

Table 1 above includes information about a mapping between coordinates of positions and corresponding channel impulse responses. In some implementations, each set of position coordinates map to a vector of channel impulse responses representing the channel impulse responses associated with the position (e.g., 210 in FIG. 4) and neighboring positions (e.g., 212).

When a terminal device, for example 154 is oriented differently such that the antenna points to different directions, the multiple paths propagated by the probe signals may be different. Thus even if the terminal device 154 is at the same location, when the terminal device 154 is oriented differently, the locator 182 may calculate different channel impulse responses based on the received probe waveforms. If the terminal device 154 is intended to be held at multiple orientations (e.g., users may hold mobile phones at various orientations), then during the training phase, the terminal device 154 may be held at various orientations and the locator 182 may determine the corresponding channel impulse responses. The coordinates of each position may map to a set of channel impulse responses corresponding to different orientations of the terminal device at the position.

Different models of terminal devices may have different types of antennas that have different signal lobes. In some implementations, the positioning system 200 may be designed to support multiple types of terminal devices (e.g., several models of mobile phones and tablet computers from several manufacturers). During the training phase, various types of terminal devices may be placed at each position so that the locator 182 can determine the channel impulse response for each type of terminal device. This way, for each position in the venue, the database 192 can have information on the channel impulse responses associated with the various types of terminal devices.

When using a terminal device 154 to perform position determination, the terminal device 154 may perform a handshaking process with the locator 182 to allow the locator 182 to obtain channel information and timing information. The terminal device 154 may also send information about the particular type (e.g., make and model) of terminal device to the locator 182. During the matching process, the locator 182 may compare the measured channel impulse response with pre-stored channel impulse responses associated with the particular type of terminal device to find a match.

There may be people in the venue. Due to movements of the people, the channel impulse response associated with a particular position may vary over time. Thus, during the training phase, for each position, the channel impulse responses may be measured at various time periods of the day, and the channel impulse responses may be stored in the database.

In some implementations, the locator 182 can be part of a mobile or stationary device. For example, the locator 182 can be implemented as part of a sensor module, a controller, a mobile phone, a laptop computer, a desktop computer, a modem, a router, an access point, a base station, or an electronic appliance that communicates wirelessly with multiple other devices.

Each of the locators 152,182, and terminal devices 154 can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Other embodiments are within the scope of the following claims. For example, the devices that communicate with the locator or base station can be different from those shown in FIG. 1A. Also, the time-reversal positioning system 200 can operate at a radio frequency in a range between 0.1 GHz to 100 GHz. That is, when the terminal device 154 sends the probe signal, the carrier frequency of the probe signal can be in a range between 0.1 GHz to 100 GHz. For example, the bandwidth of the probe signal can be equal to or greater than 20 MHz.

The time-reversal positioning system 200 can be used in combination with other positioning systems, such as those based on Wi-Fi, Bluetooth, or cellular signals. For example, a mobile phone may determine a coarse position within a venue based on Wi-Fi and/or Bluetooth and/or cellular signals with an accuracy of several meters, then use the time-reversal positioning system 200 to determine a fine position with an accuracy of a few centimeters or millimeters. When a coarse position is available, the time-reversal classifier 190 can look up the database 192 and retrieve the pre-stored information associated with the coarse position and positions in the vicinity of the coarse position, thereby significantly reducing the number of convolution operations that need to be performed.

In some implementations, the terminal device 154 may be used in certain ways such that its height is more likely to be within certain ranges. By using known information about the likely position in the z-direction, it may be possible to reduce the amount of computation required at the locator 152 in order to provide a location estimate to the terminal device 154. For example, in order to determine the position of a terminal device 154 within a room with 10 cm accuracy, one can establish a database of channel impulse responses for all possible locations where the terminal device 154 may be located using grid points spaced 10 cm apart. Assuming that the terminal device 154 can be held by the user at a height from slightly above ground to 6 feet above ground, the database can have about 18 or more data points in the z-direction for each (x, y) coordinate in the room. If the terminal device 154 is typically held within a certain range of heights, the time-reversal classifier 190 can compare the received channel impulse response with pre-stored channel impulse responses that correspond to grid points in the vicinity of the likely range of heights first, potentially reducing the amount of time needed to determine the location of the terminal device 154.

For example, suppose the terminal device is a smart watch, and the user accesses an indoor positioning app to determine his or her location in a shopping mall. The watch may include multi-axis accelerometers and other motion sensors that allow the operating system of the watch to determine whether the user is standing. When the user is standing and raises the hand to view the screen on the watch, the watch may be typically held within a certain range of heights. Different users may hold the watch at different heights, but for a given user the watch may be typically held within a certain range of heights in order for the user to be able to view the watch screen comfortably. The watch may store information about such a height range, either from past measurements performed by the indoor positioning app, or from a different app. The indoor positioning app may have a configuration menu that allows the user to input values representing the customary range of heights for various activities, such as standing and sitting.

When the watch sends the probe signal to the locator 152, the watch can also send information regarding a likely range of heights. For example, the watch may send information to the locator 152 indicating that the watch is likely at a height within a range of, e.g., 110 cm to 130 cm. The locator 152 may then compare the received channel impulse response signal with pre-stored channel impulse response signals in the database that correspond to the height range of 110 cm to 130 cm. If a strong correlation is found between the received channel impulse response signal and a pre-stored channel impulse response signal associated with a height within the height range of 110 cm to 130 cm, the locator 152 may send the coordinates associated with the pre-stored channel impulse response signal to the watch as a preliminary location estimation. The locator 152 may continue to compare the received channel impulse response signal with pre-stored channel impulse response signals in the database that correspond to the height range outside of 110 cm to 130 cm to confirm the accuracy of the preliminary location estimation.

This way, instead of searching the database for locations varying in height from, e.g., 10 cm to 180 cm (which corresponds to 18 grid points in the z direction), the locator 152 may be able to provide preliminary location information to the watch after by searching for locations varying in height from 110 cm to 130 cm (which corresponds to 3 grid points in the z direction), potentially reducing the response time by half or more, resulting in a better user experience.

In some implementations, multiple locators 182 can be used. Each locator 182 can determine the coordinates of the position of the terminal device 154. The multiple locators 182 can send the coordinates to the terminal device 154, and the terminal device 154 can determine the final coordinates of the position based on the coordinates provided by the multiple locators 182, e.g., by averaging the coordinates.

In some implementations, during the training phase, a robot can carry the terminal device to each of the multiple positions, and the probe signal may be transmitted to the base station from each position. In some examples, the terminal device can be part of the robot, the robot can move to each of the multiple positions, and the probe signal can be transmitted from the robot to the base station from each position.

In some implementations, during the training phase, an unmanned aerial vehicle can carry the terminal device to each of the multiple positions, and the probe signal may be transmitted to the base station from each position. In some examples, the terminal device can be part of the unmanned aerial vehicle, the unmanned aerial vehicle can move to each of the multiple positions, and the probe signal can be transmitted from the unmanned aerial vehicle to the base station from each position.

In some implementations, a terminal device (e.g., 154) can determine its position based on pre-stored channel impulse responses downloaded from a server (e.g., access point 182). In some examples, the terminal device may download the entire database D of channel impulse responses of, e.g., a shopping mall, convention center, or airport terminal from a server to facilitate navigation within the indoor venue. In some examples, to reduce the download file size, the terminal device may download a portion of the database D covering locations in the vicinity of the terminal device. The terminal device can determine a coarse position based on, e.g., Wi-Fi, Bluetooth, or cellular signals, and send data about the coarse position to the server. The terminal device may then download, from the server, information about channel responses associated with positions at or near the coarse position. The terminal device can receive a channel probing signal from a beacon and estimate a channel impulse response based on the received channel probing waveform. The terminal device can determine a time-reversed signal based on the estimated channel impulse response, and determine a fine position of the terminal device based on the time-reversed signal and the downloaded channel impulse responses. One of the advantages of this approach is that only the terminal device knows its own precise location, while the server may only know that the terminal device is within the geographical region covered by the downloaded database. This may be useful in preserving privacy of the user.

In some implementations, the locator (e.g., 152) may broadcast a combined signal that is a combination of multiple downlink signals, in which each downlink signal has coordinate data associated with a particular position, and the downlink signal has a waveform configured to focus at the particular position. The locator may perform a handshake process with a terminal device (e.g., 154) to provide timing information useful for the terminal device to determine the timing of the broadcast of the combined signal. The terminal device may determine its location based on the coordinate data broadcast by the locator. The locator may broadcast coordinate data to a subset of locations in a room at a time, and broadcast coordinate data to different subsets of locations in the room at different times, such that coordinate data are broadcast to every intended location in the room over a period of time. One of the advantages of this approach is that the locator does not determine the location of the terminal device, and only the terminal device knows its own precise location. This may be useful in preserving privacy of the user.

In some examples, each subset of locations may cover a small region in the room, in which different locations within the subset are close to each other. Each subsequent broadcast from the locator covers a different region in the room. Similar to scanning a spotlight across different regions of the floor of a room until after a period of time every portion of the floor has been illuminated for a brief period of time by the spotlight, the locator may broadcast the coordinates to various locations within a small region at a time, and scan the region across the three-dimensional room such that after a period of time, the coordinate data have been broadcast to all grid points in the room. For example, in a 10 m-by-10 m-by-3 m room, with 10 cm spacing between grid points, the base station may broadcast coordinate data to $10 \times 10 \times 10 = 1000$ locations in a 90 cm-by-90 cm region at a time, in which the distance between adjacent targeted locations is 10 cm. Subsequently, the locator may broadcast coordinate data to an adjacent 90 cm-by-90 cm region, and so forth. After about $10 \times 10 \times 3 = 300$ broadcasts, the coordinate data have been broadcast to all $100 \times 100 \times 30$ grid points in the room.

In some examples, each subset of locations may cover a large region in the room, in which different locations within the subset are spaced farther apart from each other (compared to the previous example). Each subsequent broadcast from the base station also covers a large region but shifted slightly in a certain direction (e.g., the x-, y-, or z-direction). The locator may broadcast the coordinates to various locations within a large region at a time, and shift the region slightly in each subsequent broadcast such that after a period of time, the coordinate data have been broadcast to all grid points in the room. For example, in a 10 m-by-10 m-by-3 m room, with 10 cm spacing between grid points, the base station may broadcast coordinate data to $10 \times 10 \times 3 = 300$ locations in a 9 m-by-9 m-by-2 m region at a time, in which the distance between adjacent targeted locations in the 9 m-by-9 m-by-2 m region is about 1 m. Subsequently, the locator may broadcast coordinate data to another 9 m-by-9 m-by-2 m region, shifted from the previous region by 10 cm, and so forth, first shifting in the x-direction, then shifting in the y-direction, then shifting in the z-direction. After about $10 \times 10 \times 10 = 1000$ broadcasts, the coordinate data have been broadcast to all $100 \times 100 \times 30$ grid points in the room.

The locator may be used in connection with motion sensors in the venue so that only when there are people moving in the room will the locator start to broadcast the coordinate data. There may be several motion sensors in the venue, each covering a portion of the venue, and when one or more particular motion sensors are activated, the locator broadcasts coordinate data only to the regions associated with the activated motion sensors. This prevents unnecessary broadcasts by the locator.

In some implementations, during the training phase, the terminal device 154 does not necessarily have to be placed at grid points of an array. The terminal device 154 can be placed at random positions, and the database 192 can store the coordinates of those positions and their associated channel impulse responses. The information in the database 192 can be sorted according to the coordinates to facilitate faster retrieval.

Additional examples of positioning systems based on time-reversal technology are described in the article "A Time-Reversal Paradigm for Indoor Positioning System," which is part of U.S. patent application 62/025,795. The article also provides experimental results of a positioning system based on time-reversal technology. The positioning technology discussed in this document can be implemented in devices used in various time-reversal communication systems, such as those described in the articles "Time-Reversal Massive MIMO: Utilizing Multipaths as Virtual Antennas," "Time-Reversal with Limited Signature Precision: Tradeoff Between Complexity and Performance," and "Joint Waveform Design and Interference Pre-Cancellation for Time-Reversal Systems," which are also included in U.S. patent application 62/025,795. The positioning technology discussed in this document can also be implemented in devices used in various time-reversal communication systems described in U.S. patent application Ser. No. 13/706,342, titled "Waveform Design for Time-Reversal Systems," filed on Dec. 5, 2012, U.S. patent application Ser. No. 13/969,271, titled "Time-Reversal Wireless Systems Having Asymmetric Architecture," filed on Aug. 16, 2013, PCT patent application PCT/US2014/051148, titled "Time-Reversal Wireless Systems Having Asymmetric Architecture," filed on Aug. 14, 2014, U.S. patent application Ser. No. 13/969,320, titled "Multiuser Time-Reversal Division Multiple Access Uplink System With Parallel Interference Cancellation," filed on Aug. 16, 2013, U.S. patent application Ser. No. 14/262,153, titled "Quadrature Amplitude Modulation For Time Reversal Systems," filed on Apr. 25, 2014, U.S. patent application Ser. No. 14/202,651, titled "Time-Reversal Wireless Paradigm For Internet of Things," filed on Mar. 10, 2014. The entire disclosures of the above applications are incorporated herein by reference.

What is claimed is:

1. A method comprising:
   at a first device, receiving a probe signal sent from a second device through a multipath channel, the probe signal received at the first device having a waveform that is different from the waveform sent by the second device due to influence of the multipath channel;
   estimating a channel impulse response based on the probe signal received at the first device;
   determining a time-reversed signal based on the estimated channel impulse response;
   computing coordinates of a position of the second device based on a combination of (i) the time-reversed signal, (ii) stored first data representing channel impulse responses derived from probe signals sent from a third device at a plurality of positions in a venue, and (iii) second data representing coordinates of the plurality of positions in the venue that are stored in a storage device, in which the second device is located at one of the plurality of positions or in a vicinity of one of the plurality of positions, and determining coordinates of the position of the second device comprising determining which of the channel impulse responses represented by the first data more closely matches the channel impulse response estimated based on the probe signal sent from the second device as compared to the other channel impulse responses represented by the first data;
   for each of a plurality of positions, determining a feature value based on a function of the time-reversed signal and the stored channel impulse response associated with the position, and
   determining the position of the second device based on the position associated with a largest feature value among the feature values,
   wherein at least one of (i) the feature value associated with a position is a function of the stored channel impulse response or responses associated with one or more neighboring positions, (ii) the feature value associated with a position is a function of the stored channel impulse responses derived from probe signals sent from the position at a plurality of time periods, or (iii) determining the feature value associated with a position comprises calculating a convolution of the time-reversed signal and the stored channel impulse response associated with the position.

2. The method of claim 1 in which the second device and the third device are substantially similar devices.

3. The method of claim 1 in which the probe signal is modulated by a carrier wave, and determining a position of the second device comprises determining a position of the second device with an accuracy within one wavelength of the carrier wave.

4. The method of claim 3 in which determining a position of the second device comprises determining a position of the second device with an accuracy within one-half of a wavelength of the carrier wave.

5. The method of claim 4 in which determining a position of the second device comprises determining a position of the second device with an accuracy within one-tenth of a wavelength of the carrier wave.

6. The method of claim 1 in which the probe signal comprises one or more pulse signals.

7. The method of claim 1 in which the probe signal comprises one or more pseudorandom codes.

8. The method of claim 1 in which the probe signal comprises one or more Golay sequences.

9. The method of claim 1, comprising transmitting information about the position of the second device to the second device.

10. The method of claim 9, comprising transmitting the information about the position of the second device to the second device using time-reversal wireless communication.

11. The method of claim 1, comprising receiving coarse positioning data from the second device, selecting a subset of stored channel impulse responses based on the coarse positioning data, and determining the position of the second device based on the time-reversed signal and the subset of stored channel impulse responses.

12. An apparatus comprising:
    a storage storing (i) first data representing channel impulse responses derived from probe signals that are generated and sent from a first device at a plurality of positions in a venue and received at a second device that is different from the first device, and (ii) second data representing coordinates of the plurality of positions in the venue from which the first device sent the probe signals; and
    a data processor configured to:
    compute a position of a terminal device based on a combination of the first data, the second data, and a time-reversed signal determined based on a time-reversed version of a channel impulse response that is estimated based on a channel probing signal sent from the terminal device;

for each of a plurality of positions, determine a feature value based on a function of the time-reversed signal and the stored channel impulse response associated with the position, and determine the position of the terminal device based on the position associated with a largest feature value among the feature values, wherein at least one of (i) the feature value associated with a position is also a function of the stored channel impulse response or responses associated with one or more neighboring positions, (ii) the feature value associated with a position is a function of the stored channel impulse responses derived from probe signals sent from the position at a plurality of time periods, or (iii) determine the feature value associated with a position comprises calculate a convolution of the time-reversed signal and the stored channel impulse response associated with the position.

13. An apparatus comprising:
a circuit to receive a probe signal sent from a second device through a multipath channel, the probe signal received at the apparatus having a waveform that is different from the waveform sent by the second device due to influence of the multipath channel; and
a data processor configured to:
 estimate a channel impulse response based on the received probe signal;
 determine a time-reversed signal based on the estimated channel impulse response;
 compute coordinates of a position of the second device based on a combination of (i) the time-reversed signal, (ii) stored first data representing channel impulse responses derived from probe signals sent from a third device at a plurality of positions in a venue, and (iii) second data representing coordinates of the plurality of positions in the venue that are stored in a storage device, in which the second device is located at one of the plurality of positions or in a vicinity of one of the plurality of positions, and determine coordinates of the position of the second device comprising determine which of the plurality of positions whose coordinates are represented by the second data is closer to the position of the second device as compared to the other positions among the plurality of positions;
 for each of a plurality of positions, determine a feature value based on a function of the time-reversed signal and the stored channel impulse response associated with the position, and determine the position of the second device based on the position associated with a largest feature value among the feature values, wherein at least one of (i) the feature value associated with a position is also a function of the stored channel impulse response or responses associated with one or more neighboring positions, (ii) the feature value associated with a position is a function of the stored channel impulse responses derived from probe signals sent from the position at a plurality of time periods, or (iii) determine the feature value associated with a position comprises calculate a convolution of the time-reversed signal and the stored channel impulse response associated with the position.

14. The apparatus of claim 13 in which the second device and the third device are substantially similar devices.

15. The apparatus of claim 13 in which the probe signal comprises one or more pulse signals.

16. The apparatus of claim 13 in which the probe signal comprises one or more pseudorandom codes.

17. The apparatus of claim 13 in which the probe signal comprises one or more Golay sequences.

18. The apparatus of claim 13, comprising a transmit circuit to transmit information about the position of the second device to the second device.

19. The apparatus of claim 12 in which the data processor is configured to:
 identify a set of coordinates stored in the storage that are associated with a particular position in the venue in which the stored channel impulse response derived from the probe signal sent from the first device at the particular position matches the channel impulse response estimated based on the channel probing signal sent from the terminal device better than at least some other stored channel impulse responses derived from the probe signals sent from the first device at other positions in the venue, and
 determine coordinates of the position of the terminal device based on the identified set of coordinates associated with the particular position in the venue.

20. The apparatus of claim 12 in which the data processor is configured to:
 determine a particular one of the plurality of positions associated with channel impulse responses represented by the first data that is closer to the position of the terminal device as compared to the other positions among the plurality of positions, and
 identify a set of coordinates stored in the storage that is associated with the particular position.

* * * * *